United States Patent
Takahashi et al.

(10) Patent No.: US 12,112,518 B2
(45) Date of Patent: Oct. 8, 2024

(54) OBJECT DETECTION DEVICE, LEARNING METHOD, AND RECORDING MEDIUM

(71) Applicant: NEC Corporation, Tokyo (JP)

(72) Inventors: Katsuhiko Takahashi, Tokyo (JP); Yuichi Nakatani, Tokyo (JP); Tetsuo Inoshita, Tokyo (JP); Asuka Ishii, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 17/768,923

(22) PCT Filed: Nov. 8, 2019

(86) PCT No.: PCT/JP2019/043830
§ 371 (c)(1),
(2) Date: Apr. 14, 2022

(87) PCT Pub. No.: WO2021/090473
PCT Pub. Date: May 14, 2021

(65) Prior Publication Data
US 2024/0104891 A1    Mar. 28, 2024

(51) Int. Cl.
*G06V 10/75* (2022.01)

(52) U.S. Cl.
CPC .................... *G06V 10/759* (2022.01)

(58) Field of Classification Search
CPC ...................................... G06V 10/759
(Continued)

(56) References Cited

U.S. PATENT DOCUMENTS 5,251,268 A * 10/1993 Colley .............. G06V 30/422
706/45
2002/0061135 A1    5/2002 Naoi et al.
(Continued)

FOREIGN PATENT DOCUMENTS

JP    H07-160881 A    6/1995
JP    H08-212184 A    8/1996
(Continued)

OTHER PUBLICATIONS

Japanese Office Communication for JP Application No. 2021-554532 mailed on Jan. 24, 2023 with English Translation.

*Primary Examiner* — Allen H Nguyen

(57) ABSTRACT

In the object detection device, the plurality of object detection units output a score indicating a probability that a predetermined object exists, for each partial region set with respect to image data inputted. The weight computation unit computes a weight for each of the plurality of object detection units by using weight computation parameters and based on the image data. The weights are used when the scores outputted by the plurality of object detection units are merged. The weight redistribution unit changes the weight for a predetermined object detection unit, among the weights computed by the weight computation unit, to 0 and output the weights. The merging unit merges the scores outputted by the plurality of object detection units for each of the partial regions, by using the weights computed by the weight computation unit and including the weight changed by the weight redistribution unit. The loss computation unit computes a difference between a ground truth label of the image data and the merged score merged by the merging unit as a loss. Then, the parameter correction unit corrects the weight computation parameters so as to reduce the loss.

17 Claims, 20 Drawing Sheets

(58) Field of Classification Search
USPC .......................................................... 382/159
See application file for complete search history.

(56) References Cited

U.S. PATENT DOCUMENTS

| | | | | |
|---|---|---|---|---|
| 2007/0092133 A1* | 4/2007 | Luo | ................... | G06V 10/7747 |
| | | | | 382/173 |
| 2011/0299731 A1* | 12/2011 | Yokono | ............... | G06F 18/2148 |
| | | | | 382/103 |
| 2012/0057775 A1* | 3/2012 | Suzuki | .................... | H04N 5/76 |
| | | | | 382/154 |
| 2014/0254923 A1* | 9/2014 | Vidal Calleja | ....... | G06V 10/464 |
| | | | | 382/159 |
| 2019/0050681 A1 | 2/2019 | Tate | | |
| 2020/0160124 A1* | 5/2020 | Fu | ........................ | G06V 10/764 |
| 2022/0138490 A1 | 5/2022 | Tate | | |

FOREIGN PATENT DOCUMENTS

| | | |
|---|---|---|
| JP | 2007-058882 A | 3/2007 |
| JP | 2019-032773 A | 2/2019 |
| JP | 2019-036240 A | 3/2019 |
| JP | 2019-152964 A | 9/2019 |
| JP | 2019-175140 A | 10/2019 |

* cited by examiner

OBJECT DETECTION DEVICE, LEARNING METHOD, AND RECORDING MEDIUM

This application is a National Stage Entry of PCT/JP2019/043830 filed on Nov. 8, 2019, the contents of all of which are incorporated herein by reference, in their entirety.

TECHNICAL FIELD

The present invention relates to a technology that detects an object included in an image.

BACKGROUND ART

It is known that by performing learning using large amounts of pattern data, the performance of a recognizer can be improved. Tuning is also performed to obtain a recognizer suited to each environment from a base recognizer. Moreover, methods of improving the recognition accuracy depending on different environments have been variously proposed. For example, Patent Reference 1 discloses a pattern recognition device that performs a recognition processing in accordance with an environment where text is written. The pattern recognition device performs the recognition processing by calling any one or more recognizers from among a plurality of registered recognizers according to the state of a processing target extracted from an input image.

Also, as another measure for improving recognizer performance, a method has been proposed in which a plurality of recognizers with different characteristics are constructed, and an overall determination is made on the basis of outputs therefrom. For example, Patent Reference 2 discloses an obstacle detection device that makes a final determination on the basis of determination results of a plurality of determination units that determine whether or not an obstacle exists.

PRECEDING TECHNICAL REFERENCES

Patent Document

Patent Reference 1: Japanese Patent Application Laid-Open under No. 2007-058882
Patent Reference 2: Japanese Patent Application Laid-Open under No. 2019-036240

SUMMARY

Problem to be Solved by the Invention

In the above techniques, it is assumed that the accuracy of the plurality of recognition devices or determination devices is substantially the same. For this reason, if the accuracy is different among the plurality of recognition devices or determination devices, the accuracy of the final result may be lowered in some cases.

One object of the present invention is to provide an object detection device that enables highly accurate object detection according to the inputted image by using a plurality of recognizers of different characteristics.

Means for Solving the Problem

In order to solve the above problem, according to an example aspect of the present invention, there is provided an object detection device comprising:

a plurality of object detection units configured to output a score indicating a probability that a predetermined object exists, for each partial region set with respect to image data inputted;
a weight computation unit configured to compute a weight for each of the plurality of object detection units by using weight computation parameters and based on the image data, the weight being used when the scores outputted by the plurality of object detection units are merged;
a weight redistribution unit configured to change the weight for a predetermined object detection unit, among the weights computed by the weight computation unit, to 0 and output the weights;
a merging unit configured to merge the scores outputted by the plurality of object detection units for each of the partial regions, by using the weights computed by the weight computation unit and including the weight changed by the weight redistribution unit;
a loss computation unit configured to compute a difference between a ground truth label of the image data and the merged score merged by the merging unit as a loss; and
a parameter correction unit configured to correct the weight computation parameters so as to reduce the loss.

According to another example aspect of the present invention, there is provided an object detection device comprising:

a plurality of object detection units configured to output a score indicating a probability that a predetermined object exists, for each partial region set with respect to image data inputted;
a weight computation unit configured to compute weights used for merging the scores outputted by the plurality of object detection units by using weight computation parameters and based on the image data;
a weight redistribution unit configured to change the weight for a predetermined object detection unit, among the weights computed by the weight computation unit, to 0 and output the weights;
a merging unit configured to merge the scores outputted by the plurality of object detection units for each of the partial regions, by using the weights computed by the weight computation unit and including the weight changed by the weight redistribution unit;
an object detection unit of a target model configured to output a score indicating the probability that the predetermined object exists, for each partial region set with respect to the image data;
a loss computation unit configured to compute a loss indicating a difference of the output of the object detection unit of the target model from the ground truth label of the image data and the merged score merged by the merging unit; and
a parameter correction unit configured to correct the parameters of the object detection unit of the target model so as to reduce the loss.

According to still another example aspect of the present invention, there is provided a learning method of an object detection device, comprising:

outputting, by a plurality of object detection units, a score indicating a probability that a predetermined object exists, for each partial region set with respect to image data inputted;
computing a weight for each of the plurality of object detection units by using weight computation parameters and based on the image data, the weight being used when the scores outputted by the plurality of object detection units are merged;

changing the weight for a predetermined object detection unit, among the computed weights, to 0 and outputting the weights;

merging the scores outputted by the plurality of object detection units for each of the partial regions, by using the computed weights including the changed weight;

computing a difference between a ground truth label of the image data and the merged score as a loss; and correcting the weight computation parameters so as to reduce the loss.

According to still another example aspect of the present invention, there is provided a learning method of an object detection device, comprising:

outputting, by a plurality of object detection units, a score indicating a probability that a predetermined object exists, for each partial region set with respect to image data inputted;

computing weights used for merging the scores outputted by the plurality of object detection units by using weight computation parameters and based on the image data;

changing the weight for a predetermined object detection unit, among the computed weights, to 0 and outputting the weights;

merging the scores outputted by the plurality of object detection units for each of the partial regions, by using the computed weights including the changed weight;

outputting, by an object detection unit of a target model, a score indicating the probability that the predetermined object exists, for each partial region set with respect to the image data;

computing a loss indicating a difference of the output of the object detection unit of the target model from the ground truth label of the image data and the merged score; and correcting the parameters of the object detection unit of the target model so as to reduce the loss.

According to still another example aspect of the present invention, there is provided a recording medium storing a program causing a computer to execute:

outputting, by a plurality of object detection units, a score indicating a probability that a predetermined object exists for each partial region set with respect to image data inputted;

computing a weight for each of the plurality of object detection units by using weight computation parameters and based on the image data, the weight being used when the scores outputted by the plurality of object detection units are merged;

changing the weight for a predetermined object detection unit, among the computed weights, to 0 and outputting the weights;

merging the scores outputted by the plurality of object detection units for each of the partial regions, by using the computed weights including the changed weight;

computing a difference between a ground truth label of the image data and the merged score as a loss; and correcting the weight computation parameters so as to reduce the loss.

According to still another example aspect of the present invention, there is provided a recording medium storing a program causing a computer to execute:

outputting, by a plurality of object detection units, a score indicating a probability that a predetermined object exists, for each partial region set with respect to image data inputted;

computing weights used for merging the scores outputted by the plurality of object detection units by using weight computation parameters and based on the image data;

changing the weight for a predetermined object detection unit, among the computed weights, to 0 and outputting the weights;

merging the scores outputted by the plurality of object detection units for each of the partial regions, by using the computed weights including the changed weight;

outputting, by an object detection unit of a target model, a score indicating the probability that the predetermined object exists, for each partial region set with respect to the image data;

computing a loss indicating a difference of the output of the object detection unit of the target model from the ground truth label of the image data and the merged score; and correcting the parameters of the object detection unit of the target model so as to reduce the loss.

Effect of the Invention

According to the present invention, by combining a plurality of recognizers for object detection with different characteristics, highly accurate object detection according to the input image becomes possible.

EXAMPLE EMBODIMENTS

First Example Embodiment

Next, a first example embodiment of the present invention will be described.
(Hardware Configuration)

Figure 1:
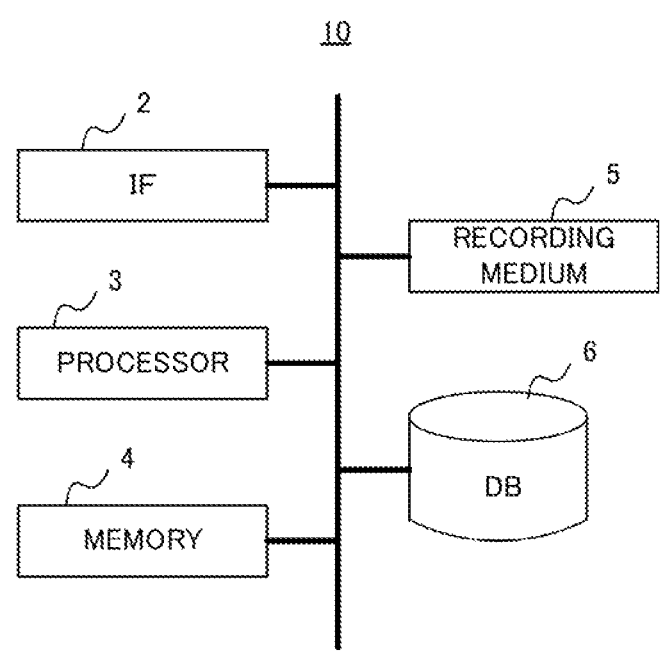
FIG. 1 is a block diagram illustrating a hardware configuration of an object detection device.

FIG. 1 is a block diagram illustrating a hardware configuration of an object detection device. As illustrated, an object detection device 10 is provided with an interface (IF) 2, a processor 3, a memory 4, a recording medium 5, and a database (DB) 6.

The interface 2 communicates with an external device. Specifically, the interface 2 is used to input image data to be subjected to object detection or image data for learning from an outside source, and to output an object detection result to an external device.

The processor 3 is a computer such as a CPU (Central Processing Unit) or a CPU and a GPU (Graphics Processing Unit), and controls the object detection device 10 as a whole by executing a program prepared in advance. The memory 4 includes ROM (Read Only Memory), RAM (Random Access Memory), and the like. The memory 4 stores various programs to be executed by the processor 3. The memory 4 is also used as a work memory when the processor 3 executes various processing.

The recording medium 5 is a non-volatile, non-transitory recording medium such as a disk-shaped recording medium or a semiconductor memory, and is configured to be removably attachable to the object detection device 10. The recording medium 5 records various programs executed by the processor 3. When the object detection device 10 executes a learning processing, a program recorded in the recording medium 5 is loaded into the memory 4 and executed by the processor 3.

The database 6 stores image data for learning that is used in the learning processing by the object detection device 10. The image data for learning includes ground truth labels. Note that in addition to the above, the object detection device 10 may also be provided with an input device such as keyboard and mouse, a display device, and the like.
(Functional Configuration for Learning)

Figure 2:
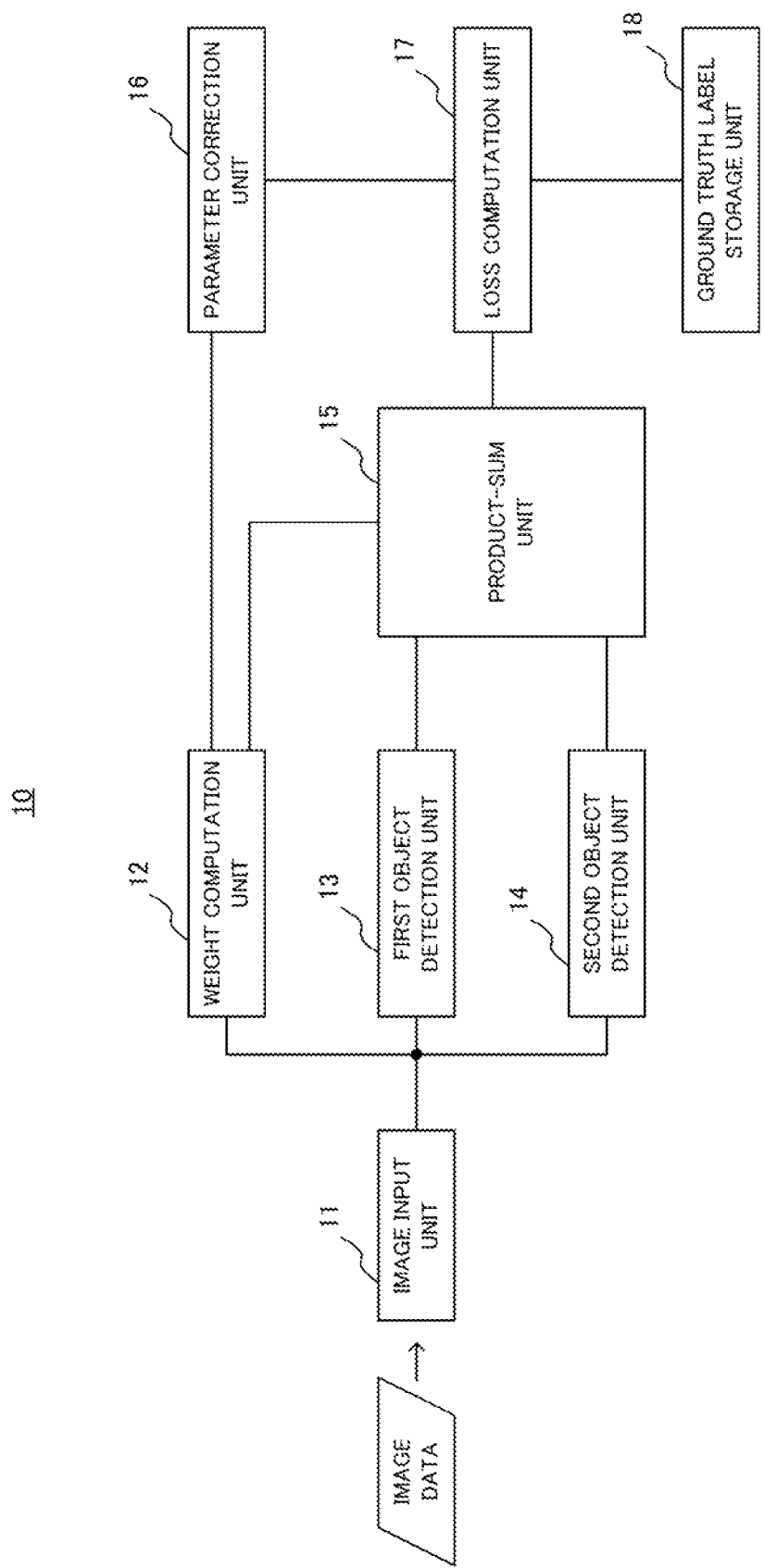
FIG. 2 illustrates a functional configuration of an object detection device for learning according to a first example embodiment.

Next, a functional configuration of the object detection device 10 for learning will be described. FIG. 2 is a block diagram illustrating a functional configuration of the object detection device 10 for learning. Note that FIG. 2 illustrates a configuration for executing a learning step of learning an optimal merging ratio of the outputs from a plurality of object detection units. As illustrated, the object detection device 10 is provided with an image input unit 11, a weight computation unit 12, a first object detection unit 13, a second object detection unit 14, a product-sum unit 15, a parameter correction unit 16, a loss computation unit 17, and a ground truth label storage unit 18. The image input unit 11 is achieved by the interface 2 illustrated in FIG. 1, while the weight computation unit 12, the first object detection unit 13, the second object detection unit 14, the product-sum unit 15, the parameter correction unit 16, and the loss computation unit 17 are achieved by the processor 3 illustrated in FIG. 1. The ground truth label storage unit 18 is achieved by the database 6 illustrated in FIG. 1.

The learning step of the object detection device 10 optimizes the internal parameters for weight computation (hereinafter referred to as "weight computation parameters") in the weight computation unit 12. Note that the first object detection unit 13 and the second object detection unit 14 are pre-trained, and do not undergo learning in the learning step.

Image data is inputted into the image input unit 11. The image data is image data for learning, and is taken in an area to be subjected to object detection. As described above, a ground truth label indicating an object included in the image is prepared in advance for each image data.

The first object detection unit 13 has a configuration similar to a neural network for object detection by deep learning, such as Single Shot Multibox Detector (SSD), RetinaNet, or Faster Regional Convolutional Neural Network (Faster-RCNN). However, the first object detection unit 13 does not perform a non-maximum suppression (NMS) processing to output detected objects with their scores and coordinate information in a list format or the like, and simply outputs score information and coordinate information for a recognition target object computed for each anchor box before the NMS processing. Here, all partial regions inspected for the presence or absence of a recognition target object are referred to as "anchor boxes".

Figure 3:
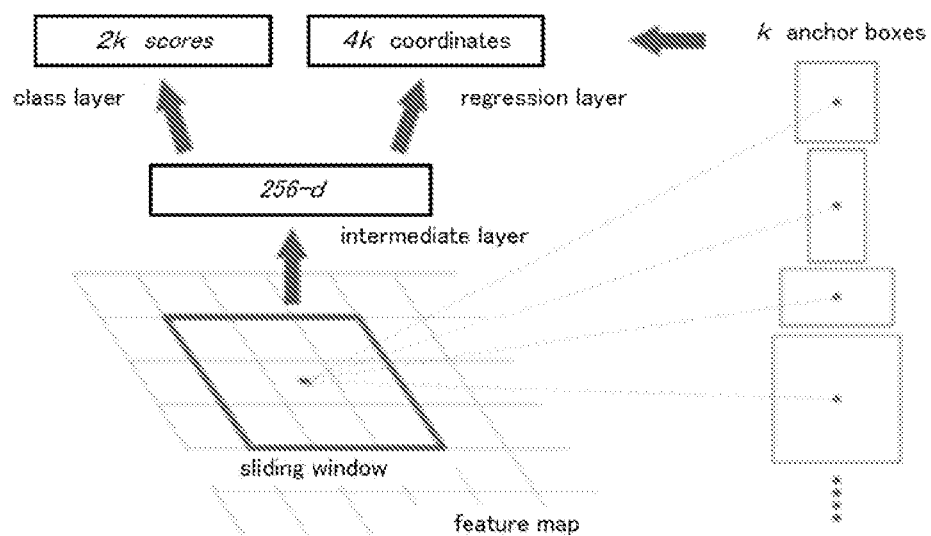
FIG. 3 is a diagram for explaining the concept of anchor boxes.

FIG. 3 is a diagram for explaining the concept of anchor boxes. As illustrated, a sliding window is set on a feature map obtained by the convolution of a CNN. In the example of FIG. 3, k anchor boxes (hereinafter simply referred to as "anchors") of different size are set with respect to a single sliding window, and each anchor is inspected for the presence or absence of a recognition target object. In other words, the anchors are k partial regions set with respect to all sliding windows.

Figure 4:
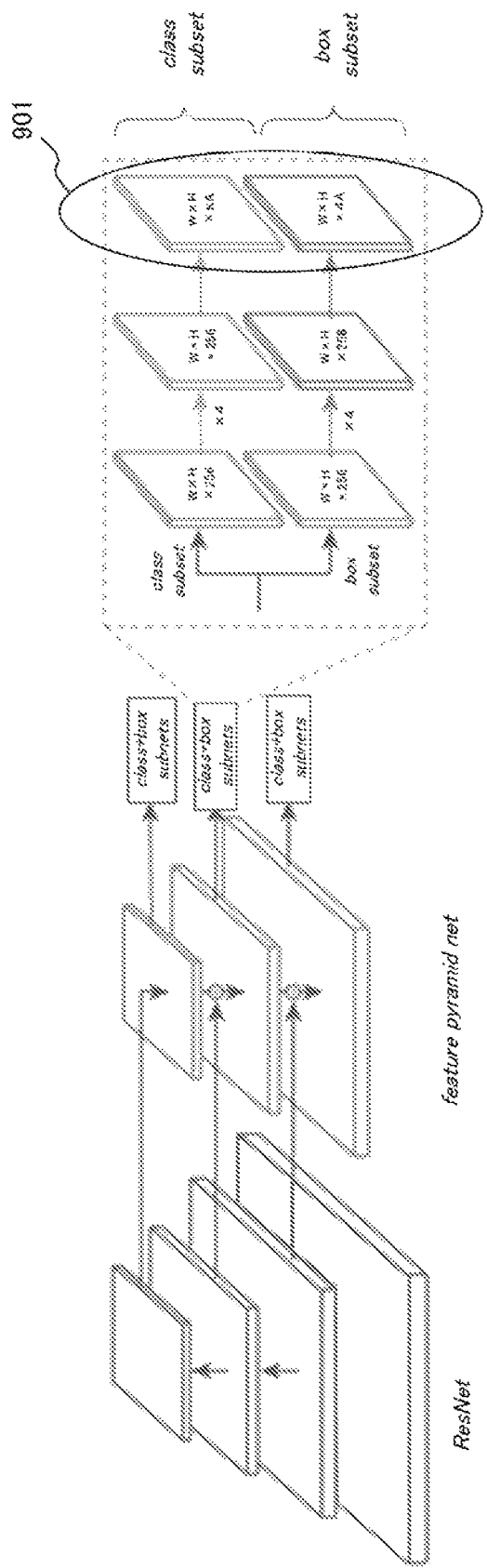
FIG. 4 is a diagram for explaining an example of an anchor.

The number of anchors depends on the structure and size of the neural network. As an example, FIG. 4 will be referenced to describe an example of anchors in the case of using RetinaNet as a model. FIG. 4 is a diagram illustrating the structure of RetinaNet. The upper row of an output network 901 stores score information with respect to W×H×A anchors (in K dimensions; that is, there are K types of recognition targets), and the lower row stores coordinate information (in four dimensions) for the W×H×A anchors. Here, "W" indicates the number of variations of the anchor center in the horizontal direction, "H" indicates the number of variations of the anchor center in the vertical direction, and "A" indicates the number of variations in the vertical or horizontal size of the anchor. The coordinate information may be expressed as absolute values of the coordinate information for the four sides on the top, bottom, left, and right of a rectangular region where a recognition target object exists or as relative positions from a reference position uniquely determined for the anchor, or may be expressed from the standpoint of the width and the height of the left side and the top side rather than the four sides.

The output network 901 illustrated is set with respect to a single layer of a feature pyramid net, and K-dimensional score information and 4-dimensional coordinate information are outputted similarly with respect to the other layers of the feature pyramid net. Hereinafter, the number of anchors set with respect to all layers of the feature pyramid net is designated "Na". The score information and coordinate information for the same anchor are saved in a predetermined memory location of a memory for storing the information, so as to be easily associated with each other. Note that as described above, the first object detection unit 13 is pre-trained so that the parameters are fixed, and does not undergo learning in the learning step of the object detection device 10.

The second object detection unit 14 is similar to the first object detection unit 13 and has the same model structure. However, the first object detection unit 13 and the second object detection unit 14 have different parameters in the respective internal networks due to such factors that the training data or the initial values of the parameters are different when learning was performed, and consequently have different recognition characteristics.

The weight computation unit 12 is configured by a deep neural network or the like that is applicable to regression problems, such as ResNet (Residual Network). The weight computation unit 12 determines weights with respect to image data inputted into the image input unit 11 when merging the score information and coordinate information outputted by the first object detection unit 13 and the second object detection unit 14, and outputs information indicating each of the weights to the product-sum unit 15. Basically, the number of dimensions of the weights is equal to the number of object detection units used. In this case, the weight computation unit 12 preferably computes weights such that the sum of the weight for the first object detection unit 13 and the weight for the second object detection unit 14 is "1". For example, the weight computation unit 12 may set the weight for the first object detection unit 13 to "$\alpha$", and set the weight for the second object detection unit 14 to "$1-\alpha$". With this arrangement, an averaging processing in the product-sum unit 15 can be simplified. Note that in the case where there are two parameters related to a single object in the object detection units (for example, a parameter indicating the probability of a certain object and a parameter indicating the improbability of a certain object), the number of dimensions of the weights is double the number of object detection units used.

The product-sum unit 15 computes the product-sums of the score information and the coordinate information outputted by the first object detection unit 13 and the second object detection unit 14 for respectively corresponding anchors on the basis of the weights outputted by the weight computation unit 12, and then calculates an average value. Note that the product-sum operation on the coordinate information is only performed on anchors for which the existence of a recognition target object is indicated by a ground truth label, and calculation is unnecessary for all other anchors. The average value is computed for each anchor and each recognition target object, and has Na×(k+4) dimensions. Note that the product-sum unit 15 is one example of a merging unit according to the present invention.

The ground truth label storage unit 18 stores ground truth labels with respect to the image data for learning. Specifically, the ground truth label storage unit 18 stores class information and coordinate information about a recognition target object existing at each anchor in an array for each anchor as the ground truth labels. The ground truth label storage unit 18 stores class information indicating that a recognition target object does not exist and coordinate information in the storage areas corresponding to anchors where a recognition target object does not exist. The class information includes a class code indicating the type of object and score information indicating the probability that an object indicated by the class code exists. Note that in many cases, the original ground truth information with respect to the image data for learning is text information indicating the type and rectangular region of a recognition target object appearing in an input image, but the ground truth labels stored in the ground truth label storage unit 18 are data obtained by converting such ground truth information into class information and coordinate information for each anchor.

For example, for an anchor that overlaps by a predetermined threshold or more with the rectangular region in which a certain object appears, the ground truth label storage unit 18 stores a value of 1.0 indicating the score of the object as the class information at the location of the ground truth label expressing the score of the object, and stores relative quantities of the position (an x-coordinate offset from the left edge, a y-coordinate offset from the top edge, a width offset, and a height offset) of the rectangular region in which the object appears with respect to a standard rectangular position of the anchor as the coordinate information. In addition, the ground truth label storage unit 18 stores a value indicating that an object does not exist at the location of the ground truth label expressing the scores for other objects. Also, for an anchor that does not overlap by a predetermined threshold or more with the rectangular region in which a certain object appears, the ground truth label storage unit 18 stores a value indicating that an object does not exist at the location of the ground truth label where the score and coordinate information of the object are stored. For a single anchor, the class information is k-dimensional, and the coordinate information is 4-dimensional. For all anchors, the class information is (Na×k)-dimensional and the coordinate information is (Na×4)-dimensional. To this conversion, it is possible to apply methods used by deep neural network programs for object detection tasks and generally available to the public.

The loss computation unit 17 checks the score information and coordinate information of (Na×(k+4))-dimension outputted by the product-sum unit 15 with the ground truth labels stored in the ground truth label storage unit 18 to compute a loss value. Specifically, the loss computation unit 17 computes an identification loss related to the score information and a regression loss related to the coordinate information. The (Na×(k+4))-dimensional average value outputted by the product-sum unit 15 is defined in the same way as the score information and coordinate information that the first object detection unit 13 outputs for each anchor and each recognition target object. Consequently, the loss computation unit 17 can compute the value of the identification loss by a method that is exactly the same as the method of computing the identification loss with respect to the output of the first object detection unit 13. The loss computation unit 17 computes the cumulative differences of the score information with respect to all anchors as the identification loss. Also, for the regression loss, the loss computation unit 17 computes the cumulative differences of the coordinate information only with respect to anchors where an object exists, and does not consider the difference of the coordinate information with respect to anchors where no object exists.

Note that deep neural network learning using identification loss and regression loss is described in the following document, which is incorporated herein as a reference. "Learning Efficient Object Detection Models with Knowledge Distillation", NeurIPS 2017

The parameter correction unit 16 corrects the parameters of the network in the weight computation unit 12 so as to reduce the loss computed by the loss computation unit 17. At this time, the parameter correction unit 16 fixes the parameters of the networks in the first object detection unit 13 and the second object detection unit 14, and only corrects the parameters of the weight computation unit 12. The parameter correction unit 16 can compute parameter correction quantities by ordinary error backpropagation. By learning the parameters of the weight computation unit 12 in this way, it is possible to construct an object detection device that optimally computes the product-sums of the outputs from the first object detection unit 13 and the second object detection unit 14 to make an overall determination.

Figure 5:
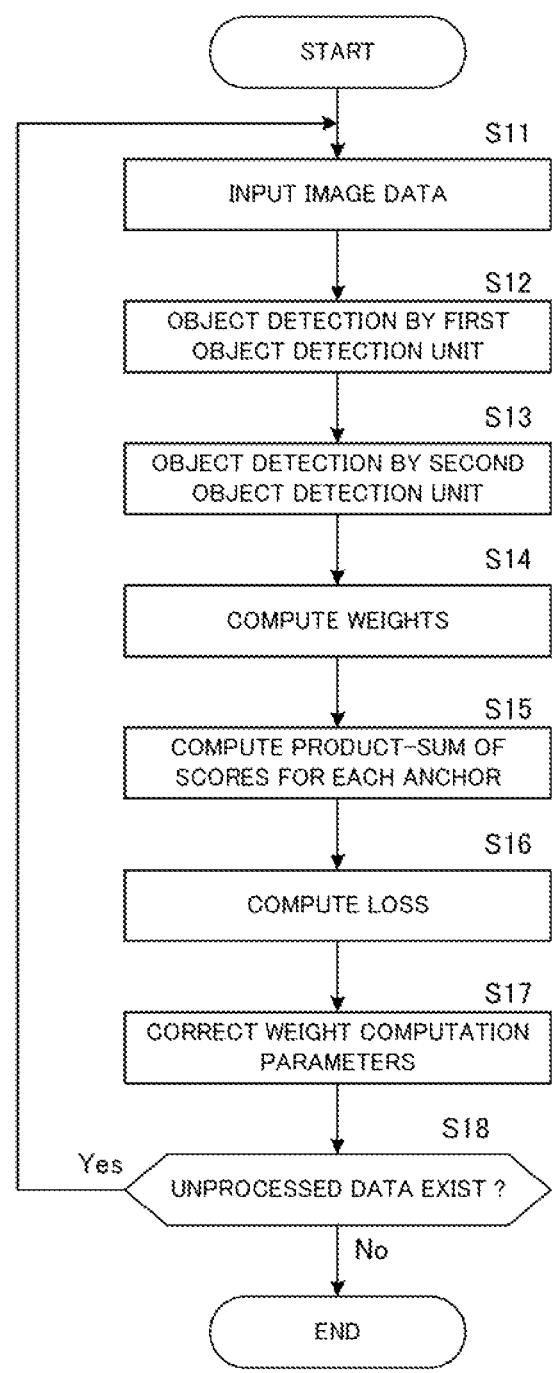
FIG. 5 is a flowchart of learning processing by the object detection device according to the first example embodiment.

Next, operations by the object detection device 10 for learning will be described. FIG. 5 is a flowchart of a learning processing by the object detection device 10. This processing is achieved by causing the processor 3 illustrated in FIG. 1 to execute a program prepared in advance.

First, image data for learning is inputted into the image input unit 11 (step S11). The first object detection unit 13 performs object detection using the image data, and outputs score information and coordinate information about recognition target objects in the images for each anchor and each recognition target object (step S12). Similarly, the second object detection unit 14 performs object detection using the image data, and outputs score information and coordinate information about recognition target objects in the images for each anchor and each recognition target object (step S13). Also, the weight computation unit 12 receives the image data and computes weights with respect to each of the outputs from the first object detection unit 13 and the second object detection unit 14 (step S14).

Next, the product-sum unit 15 multiplies the score information and coordinate information about recognition target objects outputted by the first object detection unit 13 and the score information and coordinate information about recognition target objects outputted by the second object detection unit 14 by the respective weights computed by the weight computation unit 12, and adds the results together to output the average value (step S15). Next, the loss computation unit 17 checks the difference between the obtained average value and the ground truth labels, and computes the loss (step S16). Thereafter, the parameter correction unit 16 corrects the weight computation parameters in the weight computation unit 12 to reduce the value of the loss (step S17).

The object detection device 10 repeats the above steps S11 to S17 while a predetermined condition holds true, and then ends the process. Note that the "predetermined condition" is a condition related to the number of repetitions, the degree of change in the value of the loss, or the like, and any method widely adopted as a learning procedure for deep learning can be used.

As described above, according to the object detection device 10 of the first example embodiment, the weight computation unit 12 predicts what each object detection unit is good or poor at with respect to an input image to optimize the weights, multiplies the weights by the output from each object detection unit, and averages the results. Consequently, a final determination can be made with high accuracy compared to a standalone object detection unit. For example, in the case where the first object detection unit 13 is good at detecting a pedestrian walking alone and the second object detection unit 14 is good at detecting pedestrians walking in a group, if a person walking alone happens to appear in an input image, the weight computation unit 12 assigns a larger weight to the first object detection unit 13. Additionally, the parameter correction unit 16 corrects the parameters of the weight computation unit 12 such that the weight computation unit 12 computes a large weight for the object detection unit that is good at recognizing the image data for learning.

(Functional Configuration for Inference)

Figure 6:
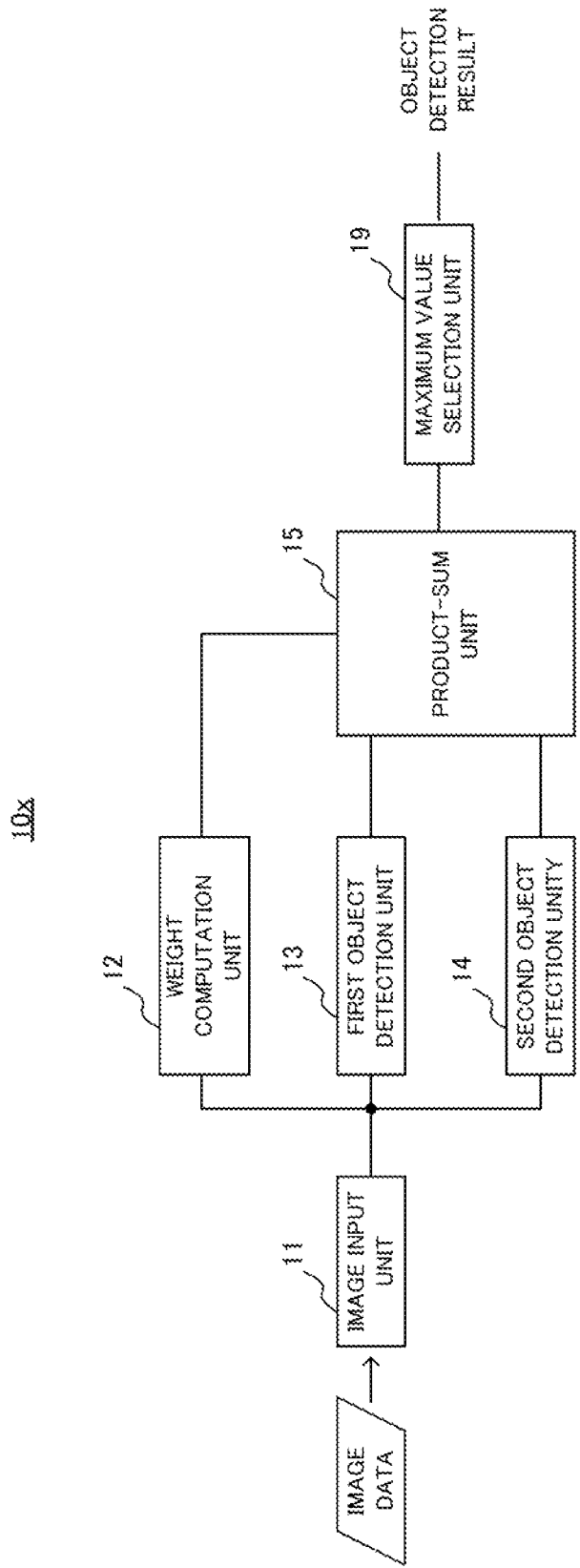
FIG. 6 illustrates a functional configuration of an object detection device for inference according to the first example embodiment.

Next, a functional configuration of an object detection device for inference will be described. FIG. 6 is a block diagram illustrating a functional configuration of an object detection device 10x for inference. Note that the object detection device 10x for inference is also basically achieved with the hardware configuration illustrated in FIG. 1.

As illustrated in FIG. 6, the object detection device 10x for inference is provided with an image input unit 11, a weight computation unit 12, a first object detection unit 13, a second object detection unit 14, a product-sum unit 15, and a maximum value selection unit 19. Here, the image input unit 11, the weight computation unit 12, the first object detection unit 13, the second object detection unit 14, and the product-sum unit 15 are similar to the object detection device 10 for learning illustrated in FIG. 2. Also, a weight computation unit that has been trained by the above learning process is used as the weight computation unit 12.

The maximum value selection unit 19 performs an NMS process on the (Na×k)-dimensional score information outputted by the product-sum unit 15 to identify the type of a recognition target object, specifies the position from the coordinate information corresponding to the anchor, and outputs an object detection result. The object detection result includes the type and position of each recognition target object. With this arrangement, it is possible to to obtain an object detection result when the outputs from the first object detection unit 13 and the second object detection unit 14 are optimally merged to make an overall determination.

Figure 7:
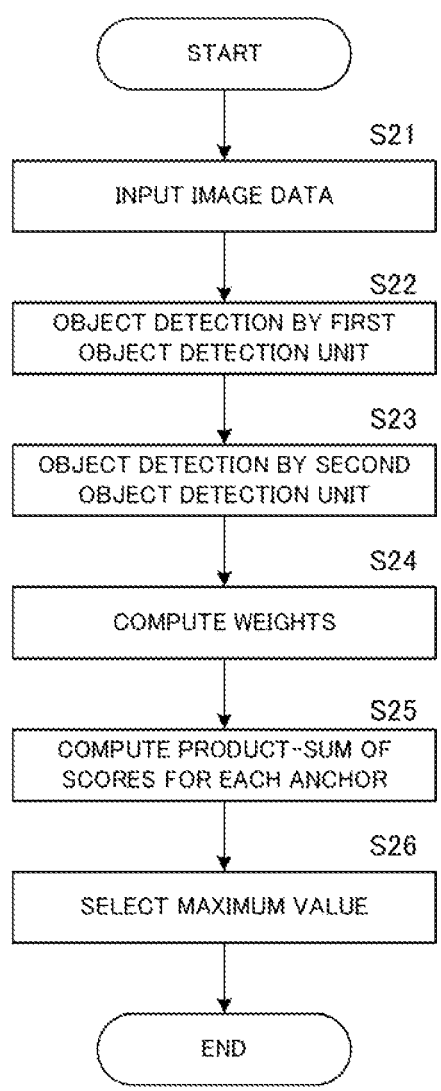
FIG. 7 is a flowchart of inference processing by the object detection device according to the first example embodiment.

Next, operations by the object detection device 10x for inference will be described. FIG. 7 is a flowchart of an inference processing by the object detection device 10x. This processing is achieved by causing the processor 3 illustrated in FIG. 1 to execute a program prepared in advance.

First, image data for inference is inputted into the image input unit 11 (step S21). The first object detection unit 13 performs object detection using the image data, and outputs score information and coordinate information about recognition target objects in the images for each anchor and each recognition target object (step S22). Similarly, the second object detection unit 14 performs object detection using the image data, and outputs score information and coordinate information about recognition target objects in the images for each anchor and each recognition target object (step S23). Also, the weight computation unit 12 receives the image data and computes weights with respect to each of the outputs from the first object detection unit 13 and the second object detection unit 14 (step S24).

Next, the product-sum unit 15 multiplies the score information and coordinate information about recognition target objects outputted by the first object detection unit 13 and the score information and coordinate information about recognition target objects outputted by the second object detection unit 14 by the respective weights computed by the weight computation unit 12, and adds the results together to output the average value (step S25). Finally, the maximum value selection unit 19 performs the NMS processing on the average value, and outputs the type and position of the recognition target object as an object detection result (step S26).

(Modifications)

The following modifications can be applied to the first example embodiment described above.

(1) In the first example embodiment described above, learning is performed using score information and coordinate information outputted by each object detection unit. However, learning may also be performed using only score information, without using coordinate information.

(2) In the first example embodiment described above, the two object detection units of the first object detection unit 13 and the second object detection unit 14 are used. However, using three or more object detection units poses no problem in principle. In this case, it is sufficient if the dimensionality (number) of weights outputted by the weight computation unit 12 is equal to the number of object detection units.

(3) Any deep learning method for object detection may be used as the specific algorithms forming the first object detection unit 13 and the second object detection unit 14. Moreover, the weight computation unit 12 is not limited to deep learning for regression problems, and any function that can be learned by error backpropagation may be used. In other words, any error function that is partially differentiable by the parameters of a function that computes weights may be used.

(4) Additionally, while the first example embodiment described above is directed to the object detection device, it is not limited to the detection of objects, and it may also be configured as an event detection device that outputs event information and coordinate information about an event occurring in an image. An "event" refers to something like a behavior, movement, or gesture by a predetermined person or a natural phenomenon such as a mudslide, an avalanche, or a rise in the water level of a river, for example.

(5) Also, in the first example embodiment described above, while object detection units having the same model structure are used as the first object detection unit 13 and the second object detection unit 14, different models may also be used. In such a case, it is necessary to devise associations in the product-sum unit 15 between the anchors of both models corresponding to substantially the same positions. This is because the anchors of different models do not match exactly. As a practical implementation, each anchor set in the second object detection unit 14 may be associated with one of the anchors set in the first object detection unit 13, a weighted average may be calculated for each anchor set in the first object detection unit 13, and score information and coordinate information may be outputted for each anchor and each recognition target object set in the first object detection unit 13. The anchor associations may be determined by calculating image regions corresponding to anchors (rectangular regions where an object exists) and associating the anchors for which image regions appropriately overlap each other.

Second Example Embodiment

Next, a second example embodiment of the present invention will be described. Note that the object detection device 20 for learning and the object detection device 20x for inference described below are both achieved with the hardware configuration illustrated in FIG. 1.

(Functional Configuration for Learning)

Figure 8:
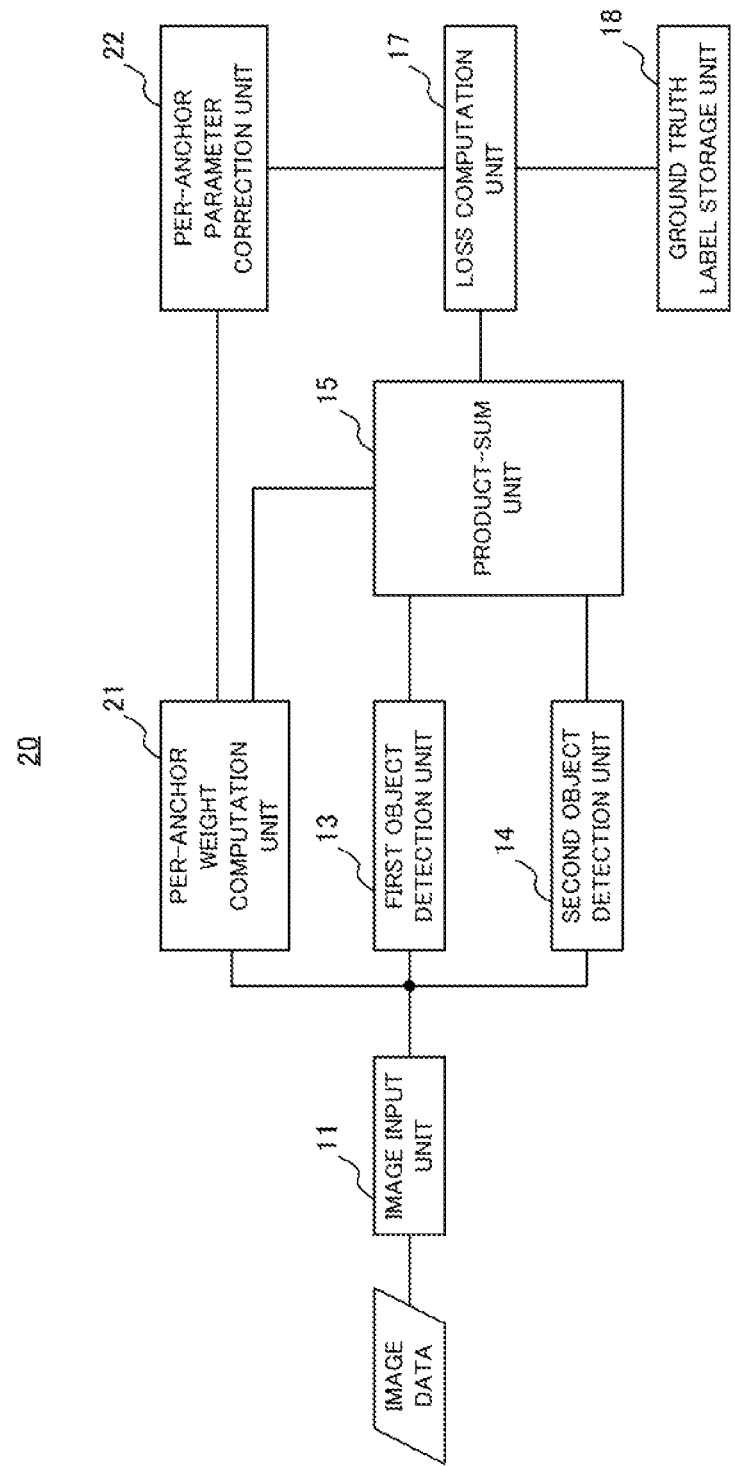
FIG. 8 illustrates a functional configuration of an object detection device for learning according to a second example embodiment.

FIG. 8 is a block diagram illustrating a functional configuration of an object detection device 20 for learning according to the second example embodiment. As illustrated, the object detection device 20 for learning includes a per-anchor weight computation unit 21 and a per-anchor parameter correction unit 22 instead of the weight computation unit 12 and the parameter correction unit 16 in the object detection device 10 illustrated in FIG. 2. Otherwise, the object detection device 20 according to the second example embodiment is the same as the object detection device 10 according to the first example embodiment. In other words, the image input unit 11, the first object detection unit 13, the second object detection unit 14, the product-sum unit 15, the loss computation unit 17, and the ground truth label storage unit 18 are the same as the respective units of the object detection device 10 according to the first example embodiment, and basically operate similarly to the first example embodiment.

The per-anchor weight computation unit 21 computes weights with respect to the first object detection unit 13 and the second object detection unit 14 for each anchor set in image data inputted into the image input unit 11 on the basis of the image data, and outputs the computed weights to the product-sum unit 15. Here, whereas the weight computation unit 12 according to the first example embodiment sets a single weight for the image as a whole with respect to the output of each object detection unit, the per-anchor weight computation unit 21 according to the second example embodiment computes a weight for each anchor with respect to the output of each object detection unit, that is, for each partial region of the image. Provided that Na is the number of anchors set in the image data and Nf is the number of object detection units, the number of dimensions of the information indicating the weight outputted by the per-anchor weight computation unit 21 is Na×Nf dimensions. The per-anchor weight computation unit 21 can be configured by a deep neural network applicable to multidimensional regression problems or the like. Also, the per-anchor weight computation unit 21 may include a network having a structure that averages the weights corresponding to nearby anchors, such that nearby anchors for respective object detection units have weights that are as close to each other as possible.

The product-sum unit 15 computes the product-sums of the score information and the coordinate information outputted for each anchor and each recognition target object by each of the first object detection unit 13 and the second object detection unit 14 on the basis of the weights for each object detection unit and each anchor outputted by the per-anchor weight computation unit 21 while associating the same information with each other, and then calculates an average value. The number of dimensions of the average value is Na×(k+4) dimensions, which is the same as the first example embodiment.

The per-anchor parameter correction unit 22 corrects the weight computation parameters for each object detection unit and each anchor in the per-anchor weight computation unit 21 so as to reduce the loss computed by the loss computation unit 17. At this time, like the first example embodiment, the parameters of the networks in the first object detection unit 13 and the second object detection unit 14 are fixed, and the per-anchor parameter correction unit 22 only corrects the parameters of the per-anchor weight computation unit 21. The parameter correction quantities can be computed by ordinary error backpropagation.

During learning, the object detection device 20 according to the second example embodiment executes the processing basically similar to the learning processing according to the first example embodiment illustrated in FIG. 5. However, in the second example embodiment, the per-anchor weight computation unit 21 computes the weights with respect to the output from each object detection unit for each anchor in step S14 of the learning processing illustrated in FIG. 5. Also, in step S17, the per-anchor parameter correction unit 22 corrects the weight computation parameters in the per-anchor weight computation unit 21 for each anchor.

(Functional Configuration for Inference)

Figure 9:
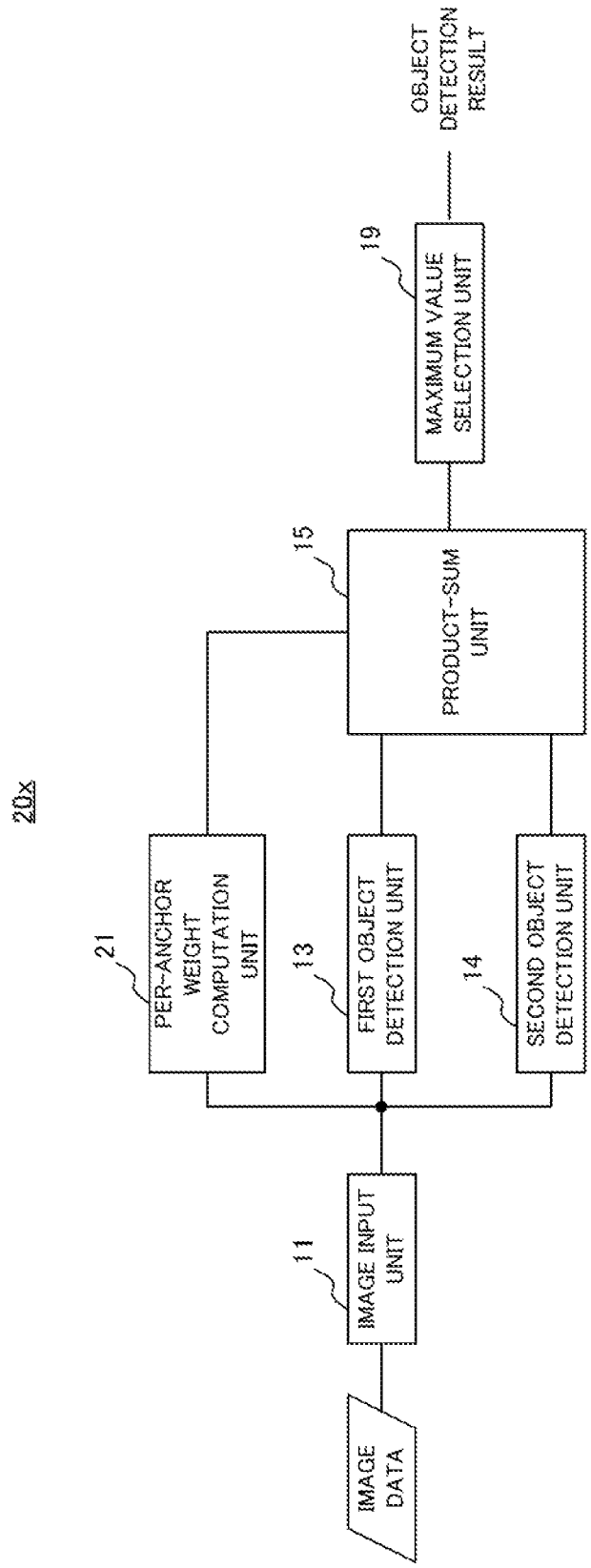
FIG. 9 illustrates a functional configuration of an object detection device for inference according to the second example embodiment.

A configuration of an object detection device for inference according to the second example embodiment will be described. FIG. 9 is a block diagram illustrating a functional configuration of the object detection device 20x for inference according to the second example embodiment. The object detection device 20x for inference according to the second example embodiment includes a per-anchor weight computation unit 21 instead of the weight computation unit 12 in the object detection device 10x for inference according to the first example embodiment illustrated in FIG. 6. Otherwise, the object detection device 20x for inference according to the second example embodiment is the same as the object detection device 10x for inference according to the first example embodiment. Consequently, in the second example embodiment, the per-anchor weight computation unit 21 computes and outputs weights for each anchor to the first object detection unit 13 and the second object detection unit 14.

During inference, the object detection device 20x according to the second example embodiment executes the processing basically similar to the inference processing according to the first example embodiment illustrated in FIG. 7. However, in the second example embodiment, the per-anchor weight computation unit 21 computes the weights with respect to the output from each object detection unit for each anchor in step S24 of the inference processing illustrated in FIG. 7. In the second example embodiment, weights are computed on the basis of inputted image data by estimating the probability of the output from each object detection unit for each anchor, i.e., for each location, and the weights are used to calculate a weighted average of the outputs from the object detection units. Consequently, the outputs from a plurality of object detection units can be used to make a more accurate final determination. For example, in the case where the first object detection unit 13 is good at detecting a pedestrian walking alone and the second object detection unit 14 is good at detecting pedestrians walking in a group, if a person walking alone and persons walking in a group both appear in an inputted image, the per-anchor weight computation unit 21 outputs weights that give more importance on the output from the first object detection unit 13 for the anchors corresponding to the region near the position of the person walking alone and give more importance on the output from the second object detection unit 14 for the anchors corresponding to the region near the position of the persons walking in a group. In this way, a more accurate final determination becomes possible. Furthermore, the per-anchor parameter correction unit 22 can correct the parameters for each partial region of the image such that the per-anchor weight computation unit 21 outputs weights that give more importance on the output from the object detection unit that is good at recognizing the image data for learning.

(Modifications)

The modifications (1) to (5) of the first example embodiment described above can also be applied to the second example embodiment. Furthermore, the following modification (6) can be applied to the second example embodiment.

(6) In the second example embodiment described above, the per-anchor weight computation unit 21 computes optimal weights for each anchor. However, if the object detection units have different binary classifiers for each class like in RetinaNet for example, the weights may be changed for each class rather than for each anchor. In this case, a per-class weight computation unit may be provided instead of the per-anchor weight computation unit 21, and a per-class parameter correction unit may be provided instead of the per-anchor parameter correction unit 22. Provided that Na is the number of anchors set in the image data and Nf is the number of object detection units, the number of dimensions of the weights outputted by the per-anchor weight computation unit 21 is Na×Nf dimensions. On the other hand, provided that the number of classes is Nc dimensions, the number of dimensions of the weights outputted by the per-class weight computation unit is Nc×Nf dimensions. To learn the parameters of the per-class weight computation unit with the per-class parameter correction unit, it is sufficient to apply backpropagation so as to minimize the loss from the output layer neuron side as usual. According to this configuration, in the case where the respective object detection units are good at detecting different classes, for example, it is possible to compute different optimal weights for each class.

Third Example Embodiment

Next, a third example embodiment of the present invention will be described. The third example embodiment uses shooting environment information about the image data to compute weights for each object detection unit. Note that the object detection device 30 for learning and the object detection device 30x for inference described below are both achieved with the hardware configuration illustrated in FIG. 1.

(Functional Configuration for Learning)

Figure 10:
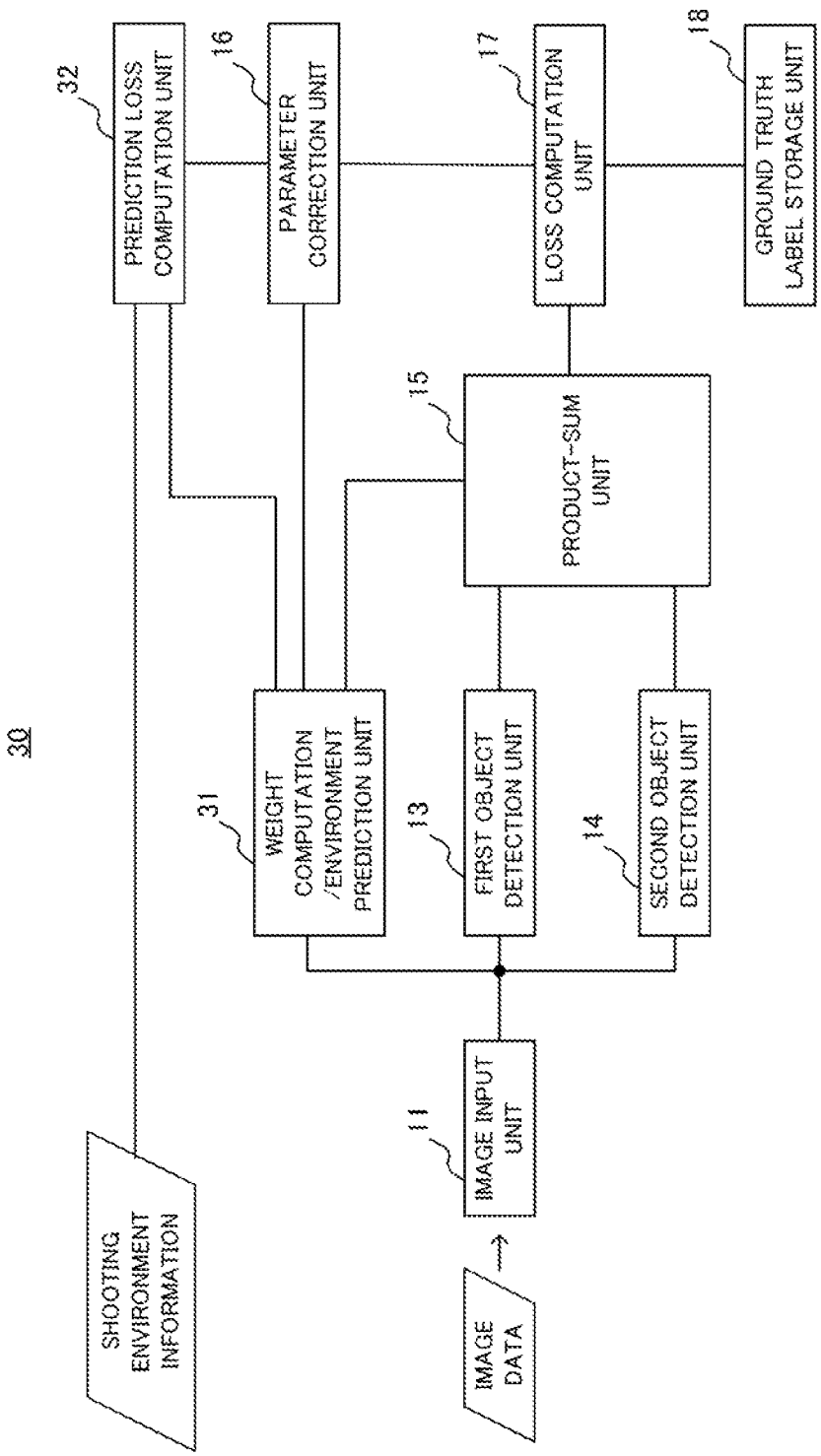
FIG. 10 illustrates a functional configuration of an object detection device for learning according to a third example embodiment.

FIG. 10 is a block diagram illustrating a functional configuration of an object detection device 30 for learning according to the third example embodiment. As illustrated, the object detection device 30 for learning is provided with a weight computation/environment prediction unit 31 instead of the weight computation unit 12 in the object detection device 10 illustrated in FIG. 2, and additionally includes a prediction loss computation unit 32. Otherwise, the object detection device 30 according to the third example embodiment is the same as the object detection device 10 according to the first example embodiment. In other words, the image input unit 11, the first object detection unit 13, the second object detection unit 14, the product-sum unit 15, the loss computation unit 17, and the ground truth label storage unit 18 are the same as the respective units of the object detection device 10 according to the first example embodiment, and basically operate similarly to the first example embodiment.

Shooting environment information is inputted into the prediction loss computation unit 32. The shooting environment information is information indicating the environment where the image data inputted into the image input unit 11 was shot. For example, the shooting environment information is information such as (a) an indication of the installation location (indoors or outdoors) of the camera used to acquire the image data, (b) the weather at the time (sunny, cloudy, rainy, or snowy), (c) the time (daytime or nighttime), and (d) the tilt angle of the camera (0-30 degrees, 30-60 degrees, or 60-90 degrees).

The weight computation/environment prediction unit 31 uses weight computation parameters to compute weights with respect to the first object detection unit 13 and the second object detection unit 14, and at the same time also uses parameters for predicting the shooting environment (hereinafter referred to as "shooting environment prediction parameters") to predict the shooting environment of the inputted image data, and generate and output predicted environment information to the prediction loss computation unit 32. For example, if the four types of information (a) to (d) mentioned above are used as the shooting environment information, the weight computation/environment prediction unit 31 expresses an attribute value indicating the information of each type in one dimension, and outputs a four-dimensional value as the predicted environment information. The weight computation/environment prediction unit 31 uses some of the calculations in common when computing the weights and the predicted environment information. For example, in the case of computation using a deep neural network, the weight computation/environment prediction unit 31 uses the lower layers of the network in common, and only the upper layers are specialized for computing the weights and the predicted environment information. In other words, the weight computation/environment prediction unit 31 performs what is called multi-task learning. With this arrangement, the weight computation parameters and the environment prediction parameters have a portion shared in common.

The prediction loss computation unit 32 calculates the difference between the shooting environment information and the predicted environment computed by the weight computation/environment prediction unit 31, and outputs the difference to the parameter correction unit 16 as a prediction loss. The parameter correction unit 16 corrects the parameters of the network in the weight computation/environment prediction unit 31 so as to reduce the loss computed by the loss computation unit 17 and the prediction loss computed by the prediction loss computation unit 32.

In the third example embodiment, since a portion of the network is shared between the computation of the weights and the computation of the predicted environment information in the weight computation/environment prediction unit 31, models of similar shooting environments tend to have similar weights. As a result, an effect of making the learning in the weight computation/environment prediction unit 31 more consistent is obtained.

Note that in the third example embodiment described above, the weight computation/environment prediction unit 31 and the parameter correction unit 16 compute equal weights with respect to the entire image, similarly to the first example embodiment. Instead, the weight computation/environment prediction unit 31 and the parameter correction unit 16 may be configured to compute weights for each anchor (each partial region) like the second example embodiment.

Figure 11:
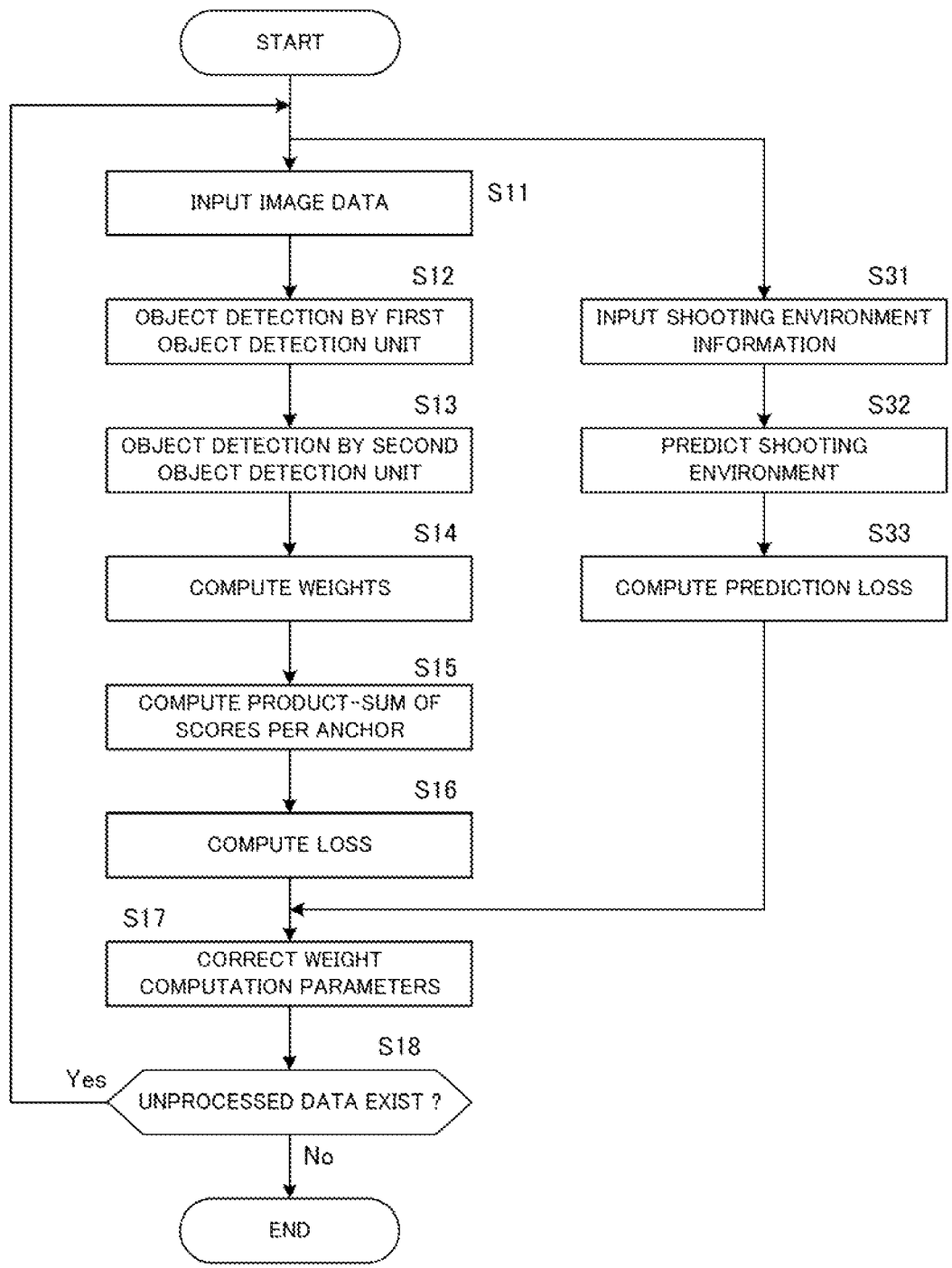
FIG. 11 is a flowchart of learning processing by the object detection device according to the third example embodiment.

Next, operations by the object detection device 30 for learning will be described. FIG. 11 is a flowchart of the learning processing by the object detection device 30 according to the third example embodiment. This processing is achieved by causing the processor 3 illustrated in FIG. 1 to execute a program prepared in advance. As understood from the comparison with FIG. 5, in the learning processing by the object detection device 30 according to the third example embodiment, steps S31 to S33 are added to the learning processing by the object detection device 10 according to the first example embodiment.

In FIG. 11, steps S11 to S16 are similar to the learning processing according to the first example embodiment. In step S16, the loss computation unit 17 checks the difference between the obtained average value and the ground truth labels, and computes and outputs the loss to the parameter correction unit 16. Meanwhile, steps S31 to S33 are executed in parallel with steps S11 to S16. Specifically, first, shooting environment information is inputted into the prediction loss computation unit 32 (step S31). Next, on the basis of the image data outputted from the image input unit 11, the weight computation/environment prediction unit 31 predicts the environment where the image data was acquired, and generates and outputs predicted environment information to the prediction loss computation unit 32 (step S32). The prediction loss computation unit 32 computes the prediction loss on the basis of the shooting environment information inputted in step S31 and the predicted environment information inputted in step S32, and outputs the prediction loss to the parameter correction unit 16 (step S33). Then, the parameter correction unit 16 corrects the parameters in the weight computation/environment prediction unit 31 so as to reduce the value of the loss computed by the loss computation unit 17 and the prediction loss computed by the prediction loss computation unit 32 (step S17). The object detection device 30 repeats the above steps S11 to S17 and S31 to S33 while a predetermined condition holds true, and then ends the processing.

(Functional Configuration for Inference)

Figure 12:
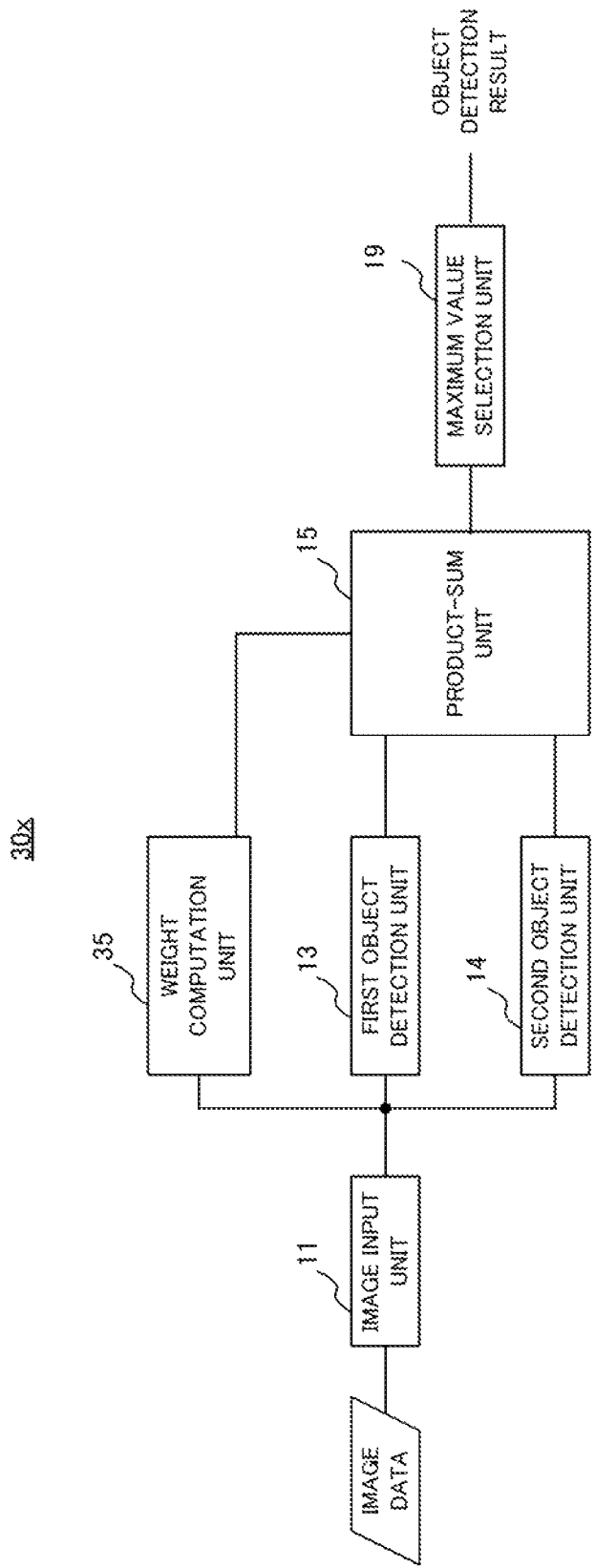
FIG. 12 illustrates a functional configuration of an object detection device for inference according to the third example embodiment.

Next, a configuration of an object detection device for inference according to the third example embodiment will be described. FIG. 12 is a block diagram illustrating a functional configuration of the object detection device 30x for inference according to the third example embodiment. The object detection device 30x for inference according to the third example embodiment includes a weight computation unit 35 instead of the weight computation unit 12 in the object detection device 10x for inference according to the first example embodiment illustrated in FIG. 6. Otherwise, the object detection device 30x for inference according to the third example embodiment is the same as the object detection device 10x for inference according to the first example embodiment.

During inference, the object detection device 30x according to the third example embodiment executes processing basically similar to the learning processing according to the first example embodiment illustrated in FIG. 7. However, in the third example embodiment, the weight computation unit 35 uses internal parameters learned using the shooting environment information by the object detection device 30 for learning described above to compute weights with respect to the first object detection unit 13 and the second object detection unit 14, and inputs the computed weights into the product-sum unit 15. Otherwise, the object detection device 30x according to the third example embodiment operates similarly to the object detection device 10x according to the first example embodiment. Consequently, the object detection device 30x according to the third example embodiment performs inference processing following the flowchart illustrated in FIG. 7, similarly to the object detection device 10x according to the first example embodiment. However, in step S24, the weight computation unit 35 computes the weights using internal parameters learned using the shooting environment information.

(Modifications)

The modifications (1) to (5) of the first example embodiment described above can also be applied to the third example embodiment.

Fourth Embodiment

Next, a fourth example embodiment of the present invention will be described. The fourth example embodiment redistributes the weights computed by the weight computation unit.

(Functional Configuration)

Figure 13:
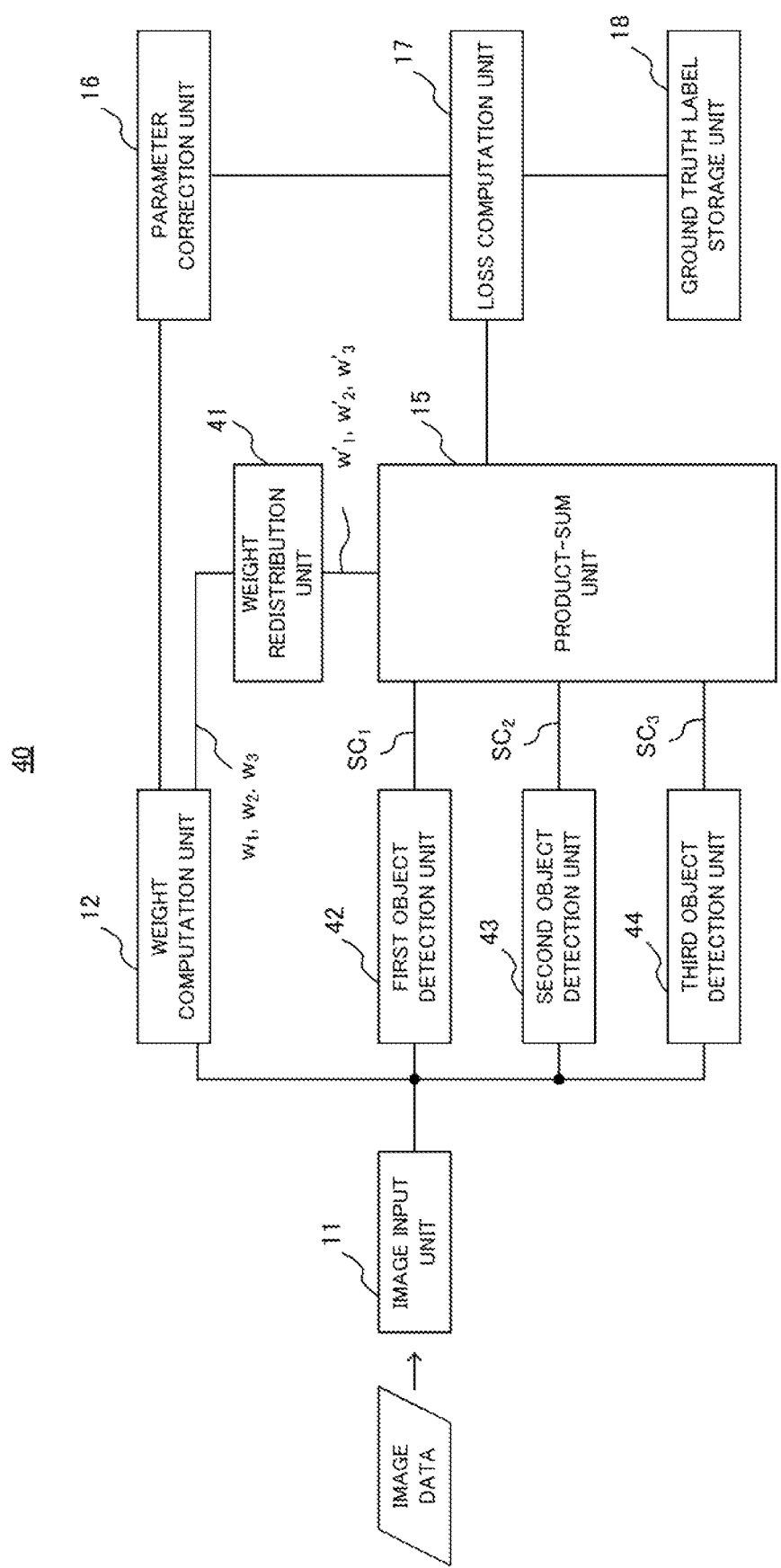
FIG. 13 illustrates a functional configuration of an object detection device for learning according to a fourth example embodiment.

FIG. 13 is a block diagram illustrating a functional configuration of an object detection device 40 for learning according to a fourth example embodiment. The object detection device for learning according to the fourth example embodiment includes a weight redistribution unit 41 in addition to the configuration of the object detection device 10 illustrated in FIG. 2. Further, instead of the first object detection unit 13 and the second object detection unit 14 shown in FIG. 2, a first to third object detection units 42 to 44 are provided.

The weight redistribution unit 41 changes the weight obtained for a predetermined object detection unit to "0" based on a predetermined condition among the weights computed by the weight computation unit 12, and normalizes the weights for the object detection units other than the predetermined object detection unit determined in advance so that the sum of the weights becomes "1". When the weight redistribution unit 41 does not perform the above-described redistribution, the weight redistribution unit 41 outputs the weights computed by the weight computation unit 12 as they are. When the redistribution is performed, the product-sum unit 15 merges the scores outputted by the first to third object detection units 42 to 44 with the redistributed weights for each anchor.

Here, the "predetermined object detection unit" is an object detection unit that is learned and constructed using the image data or a part of the image data used in learning the weight computation unit 12. Further, with respect to the "predetermined condition", for example, redistribution may be performed on the basis of a predetermined probability every time one piece of image data is inputted. Instead, a table indicating which input image is subjected to the redistribution is formed in advance, and redistribution may be performed only when the learning processing is performed for the corresponding image data.

Next, a concrete method for redistributing weights will be described. Now, it is assumed that the scores outputted by the first to third object detection units 42 to 44 are $SC_k$ (k=1, 2, 3) and the weights for the first to third object detection units 42 to 44 outputted by the weight computation unit 12 are $w_k$ (k=1, 2, 3). Further, it is assumed that the third object detection unit 44 (k=3) is the object detection unit which is learned and constructed using the same data as the image data used for the learning of the weight computation unit 12.

For example, when the weights are redistributed at the probability of 50%, the weight redistribution unit 41 generates a uniform random number from "0" to "1" each time one image data is inputted. When the value of the random number is smaller than "0.5", the weight redistribution unit 41 performs the following computation, and sets the redistributed weights $w_k'$ (k=1, 2, 3) as the weight values used in the product-sum unit 15.

$$w_3'=w_3*0$$

$$w_k'=w_k/\Sigma w_k (k=1,2)$$

On the other hand, when the random number is equal to or larger than 0.5, the weight redistribution unit 41 does not perform redistribution, and uses the weights $w_k$ as they are in the product-sum unit 15.

$$w_k'=w_k (k=1,2,3)$$

Incidentally, instead of generating a random number each time, the weight redistribution unit 41 may create a table of random numbers in advance and determine execution/non-execution of the weight redistribution by referring to the table in order. In this case, it is possible to reduce the operation time required for generating the random number.

(Effect of Weight Redistribution)

Next, the effect of the weight redistribution unit 41 will be briefly described. For example, we consider a case where there are suspicious person detection units (each corresponding to the object detection unit) constructed for a plurality of video monitoring sites watching the appearance of suspicious persons, and we are going to construct an object detection unit which similarly monitors suspicious persons for a new site using those object detection units. The suspicious person detection units constructed for the plurality of video monitoring sites correspond to the first object detection unit 42 and the second object detection unit 43 described above. At this time, the image data collected in a new video monitoring site becomes the learning data. Then, a configuration is considered in which an object detection unit learned by a general machine learning algorithm using this data is newly added as one of the object detection units to be used. This corresponds to the third object detection unit 44 described above.

Here, when the data collected at the above-described new video monitoring site is used for learning of the object detection unit, since the object detection unit 44 learned with the data collected at the new video monitoring site always performs perfect recognition, the weight computation unit 12 learns to give the maximum weight to the object detection unit 44. However, in that case, the effect of improving the detection accuracy by merging the outputs of the plurality of object detection units can not be expected. Preferably, the weights of certain degree are given to the other object detection units 42 and 43 so that useful characteristics can be drawn from the other object detection units 42 and 43 without depending on the object detection unit 44 by 100%. To realize this, the weight redistribution unit 41 probabilistically multiplies the output of the object detection unit 44 by 0 to create a condition that cannot depend on the object detection unit 44, and performs learning so that the outputs of the other object detection units 42 and 43 are merged to obtain the desired output. Thus, weights other than 0 are given to the object detection units 42 and 43 other than the object detection unit 44. By controlling the frequency at which the weight redistribution unit 41 multiplies the output of the object detection unit 44 by 0, the weight redistribution unit 41 may adjust the degree of the redistribution. As a result, it becomes possible to enjoy the accuracy improvement effect by integrating a plurality of object detection units.

An example of the effect of applying this technology to vehicle detection tasks from road surveillance camera images will be described below. A vehicle detection unit was learned and constructed for a new surveillance camera using the images of the new surveillance camera based on five vehicle detection units ("vehicle detection units 1 to 5") independently constructed for the surveillance camera. The vehicle detection performance AP (Average Precision) was "91.6". In addition, a vehicle detection unit (referred to as the "vehicle detection unit 6") was constructed by the normal learning method using only the images of the new surveillance camera. The vehicle detection performance AP of the vehicle detection unit was "90.63".

Figure 14:
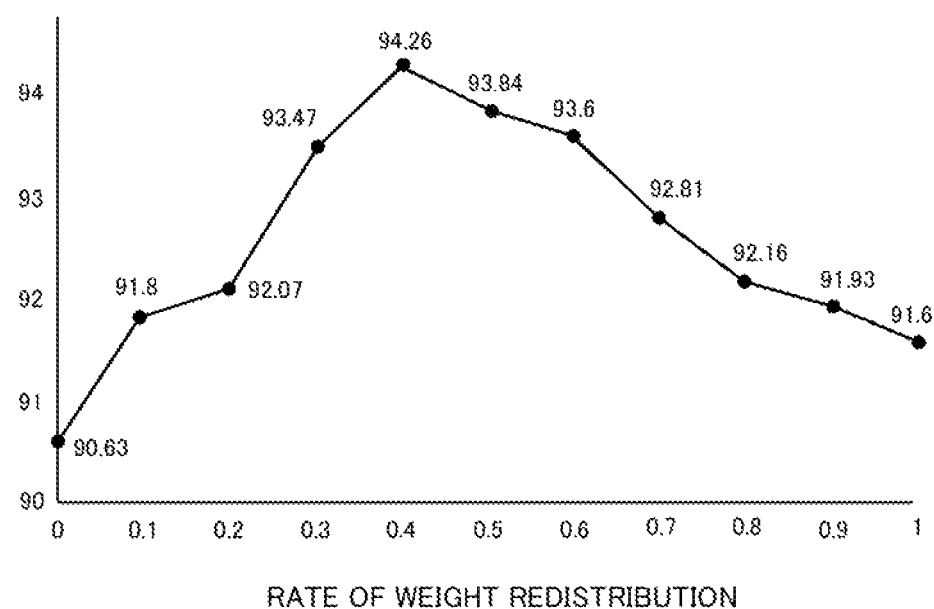
FIG. 14 illustrates an example of the effect when the object detection device of the fourth example embodiment is applied.

FIG. 14 shows the vehicle detection performance AP when the vehicle detection unit for the new surveillance camera is constructed with probabilistically changing the weight for the vehicle detection unit 6 in the range of "0 to 1" at an interval of "0.1" for each input image. In this case, when the weight was changed at the rate of probability "0.4", the vehicle detection performance AP of the vehicle detection unit for the new surveillance camera became highest value "94.26". The performance when the weight is changed at the rate of probability "0" is equal to the performance of the vehicle detection unit 6, and the performance when the weight is changed at the rate of probability "1" is equal to the performance when the vehicle detection units 1 to 5 are used. Thus, by the weight redistribution, it is possible to greatly improve the performance of the object detection unit to be constructed.

(Learning Processing)

Figure 15:
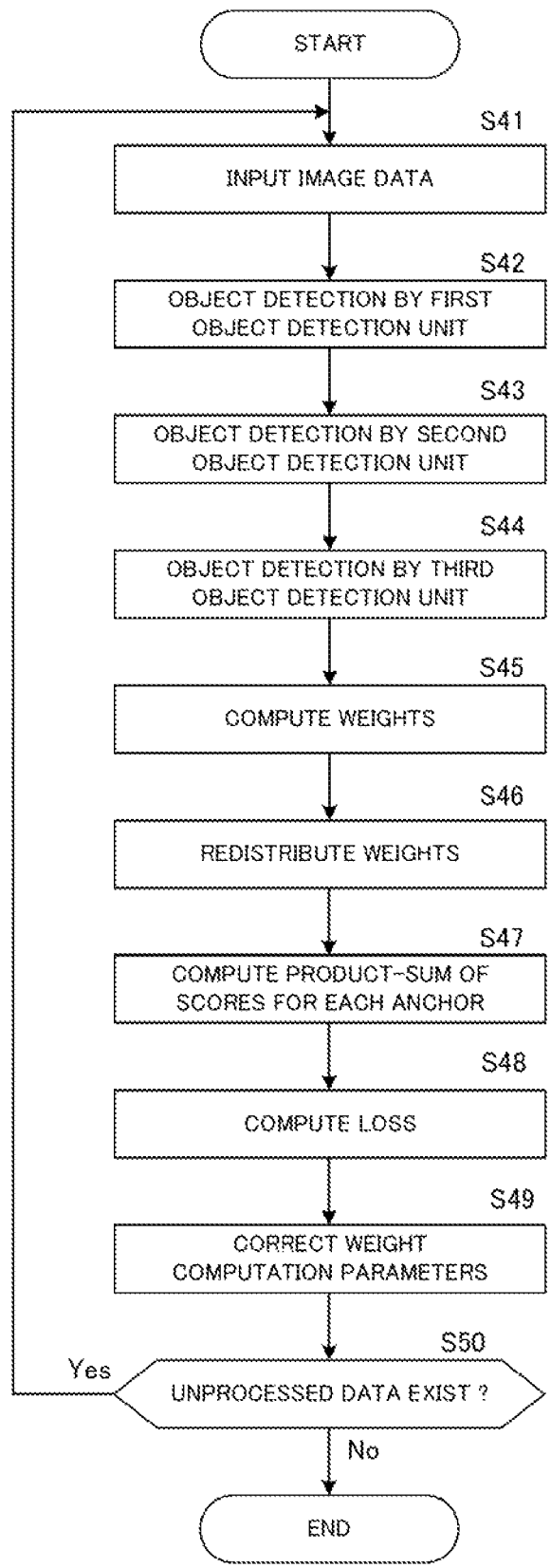
FIG. 15 is a flowchart of learning processing by the object detection device of the fourth example embodiment.

Next, the operation of the object detection device 40 for learning will be described. FIG. 15 is a flowchart of learning processing performed by the object detection device 40. This process is realized by the processor 3 shown in FIG. 1 executing a program prepared in advance.

First, image data for learning is inputted to the image input unit 11 (step S41). The first object detection unit 42 performs object detection using the image data, and outputs the score information and the coordinate information about recognition target objects in the images for each anchor and for each recognition target object (step S42). Similarly, the second object detection unit 43 performs object detection using the image data, and outputs the score information and the coordinate information about recognition target objects in the images for each anchor and for each recognition target object (step S43). Similarly, the third object detection unit 44 performs object detection using the image data, and outputs the score information and the coordinate information about recognition target objects in the image for each anchor and for each recognition target object (step S44). It is assumed that the third object detection unit 44 is constructed using the learning data equal to the learning data of the object detection device 40.

Next, the weight computation unit 12 receives the image data and computes weights with respect to each of the outputs from the first to third object detection units 42 to 44 (step S45). The weight redistribution unit 41 corrects the weights for each of the outputs of the first to third object detection units 42 to 44 based on a predetermined probability (step S46).

Next, the product-sum unit 15 multiplies the score information and coordinate information about recognition target objects outputted by the first object detection unit 42, the score information and coordinate information about recognition target objects outputted by the second object detection unit 43 and the score information and coordinate information about recognition target objects outputted by the second object detection unit 44 by the respective weights, and adds the results together to output the average value (step S47). As the weights here, the weights after redistribution are used when the weight redistribution unit 41 redistributes the weights, and the weights outputted by the weight computation unit 12 are used when the weight redistribution unit 41 does not change the weights.

Next, the loss computation unit 17 checks the difference between the obtained average value and the ground truth label, and computes the loss (step S48). Then, the parameter correction unit 16 corrects the weight computation parameters in the weight computation unit 12 to reduce the value of the loss (step S49).

The object detection device 40 repeats the above steps S41 to S49 while a predetermined condition holds true, and then ends the process. Note that the "predetermined condition" is a condition related to the number of repetitions, the degree of change in the value of the loss, or the like, and any method widely adopted as a learning procedure for deep learning can be used.

As described above, according to the object detection device 40 of the fourth example embodiment, even when the object detection unit that has learned the data including the learning data of the object detection device is included in the objects of the merge by the object detection device 40, the object detection unit can be satisfactorily learned. This is because, by changing the weight for the object detection unit that has learned the data including the learning data of the object detection device to 0 at a predetermined probability, the weight for utilizing the other object detection unit can be obtained.

Although an example including three object detection units has been shown in the above-described example embodiment, the processing can be performed exactly in the same manner even if the number of object detection units is four or more.

Note that the weight redistribution unit 41 is used only at the time of learning, and the functional configuration for inference may be exactly the same as that in the case where the weight redistribution unit 41 is not included.

As a technique of deep learning, a method called "dropout" is known in which an operation of learning with invalidating some of the weights for nodes in layers ("0") is repeated while randomly changing the node to be invalidated. The dropout is a technique for advancing learning by reducing the degree of freedom of a model by ignoring neurons at random with a fixed probability for the purpose of preventing overfitting of a neural network. On the other hand, the change of the weights by the weight redistribution unit of the present example embodiment is a mechanism for preventing the weight computation unit from learning the weight 100% depending on the part of the object detection units when the learning data of the part of the object detection units and the weight computation unit are the same or the learning data of the part of the object detection units is included in the learning data of the weight computation unit, and only the weight for the specific object detection unit is changed to "0". Therefore, the method of the present example embodiment is quite different from the dropout in terms of the purpose, application method, and effect.

Fifth Example Embodiment

Next, a fifth example embodiment of the present invention will be described. The fifth example embodiment learns a target model using a large-scale model obtained by learning while redistributing the weights by the method of the fourth example embodiment.

(Functional Configuration for Learning)

Figure 16:
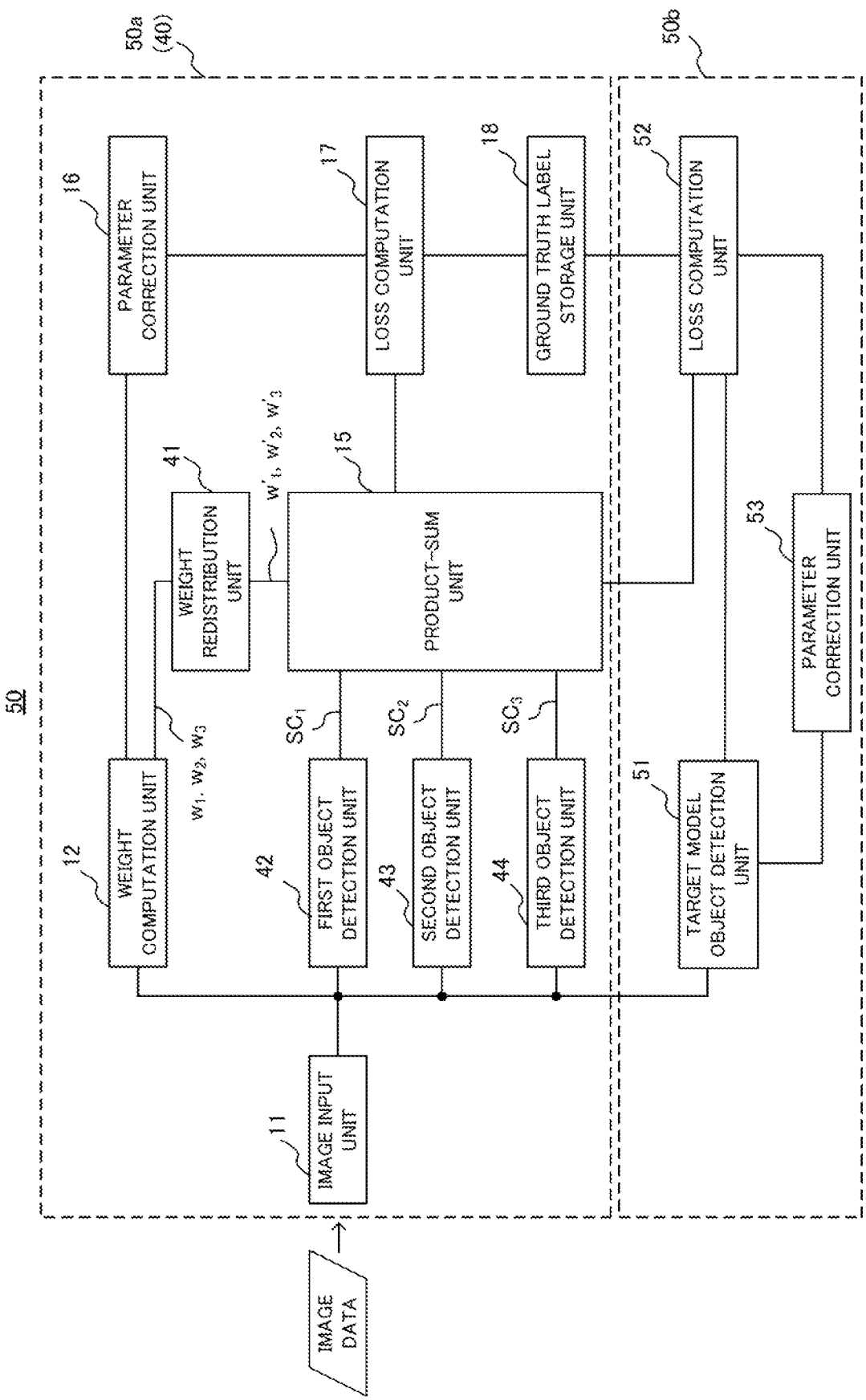
FIG. 16 illustrates a functional configuration of an object detection device for learning according to a fifth embodiment.

FIG. 16 is a block diagram illustrating a functional configuration of an object detection device 50 for learning. The object detection device 50 first executes a step of learning a large-scale model including a plurality of object detection units (hereinafter referred to as "large-scale model learning step"), and then executes a step of learning a target model using the learned large-scale model (hereinafter referred to as "target model learning step").

As shown, the object detection device 50 roughly includes a large-scale model unit 50*a* and a target model unit 50*b*. The large-scale model unit 50*a* has the same configuration as the object detection device 40 of the fourth example embodiment. That is, the large-scale model unit 50*a* includes a configuration in which the weight redistributing unit 41 redistributes the weights computed by the weight computation unit 12. Thus, the large-scale model unit 50*a* can construct a large-scale model that can optimally compute the product sum of the outputs of the three object detection units 42 to 44 and comprehensively perform the determination. Since the configuration and operation of the large-scale model unit 50*a* are the same as the object detection device 40 of the fourth example embodiment, a description thereof will be omitted here.

On the other hand, the target model unit 50*b* includes a target model object detection unit 51, a loss computation unit 52, and a parameter correction unit 53. The target model object detection unit 51 is an object detection unit of a target model to be newly constructed. The target model object detection unit 51 has a configuration similar to a neural network for object detection that is the same as the first to third object detection units 42 to 44. The target model object detection unit 51 outputs the score information and the coordinate information of the recognition target objects to the loss computation unit 52 based on the image data for learning which is inputted to the image input unit 11.

Similarly to the loss computation unit 17, the loss computation unit 52 checks the score information and the coordinate information outputted by the target model object detection unit 51 with the ground truth label stored in the ground truth label storage unit 18 to compute the identification loss and the regression loss. Further, the loss computation unit 52 checks the score information and the coordinate information outputted by the target model object detection unit 51 with the score information and the coordinate information outputted by the product-sum unit 15 to compute the identification loss and the regression loss. The score information and the coordinate information outputted by the product-sum unit 15 correspond to the score information and the coordinate information by the large-scale model. Then, the loss computation unit 52 supplies the computed loss to the parameter correction unit 53.

Incidentally, the image data for learning may include image data that does not have a ground truth label (referred to as "unlabeled image data"). For unlabeled image data, the loss computation unit 52 only outputs, to the parameter correction unit 53, the identification loss and the regression loss generated by checking the score information and the coordinate information outputted by the target model object detection unit 51 with the score information and the coordinate information outputted by the product-sum unit 15. Hereinafter, the loss computed by the loss computation unit 52 is computed also referred to as "target model loss".

The parameter correction unit 53 corrects the parameters of the network inherent in the target model object detection unit 51 so as to reduce the loss computed by the loss computation unit 52. The parameter correction unit 53 can compute the correction amounts of the parameters by the normal error back propagation method.

(Learning Processing)

Figure 17:
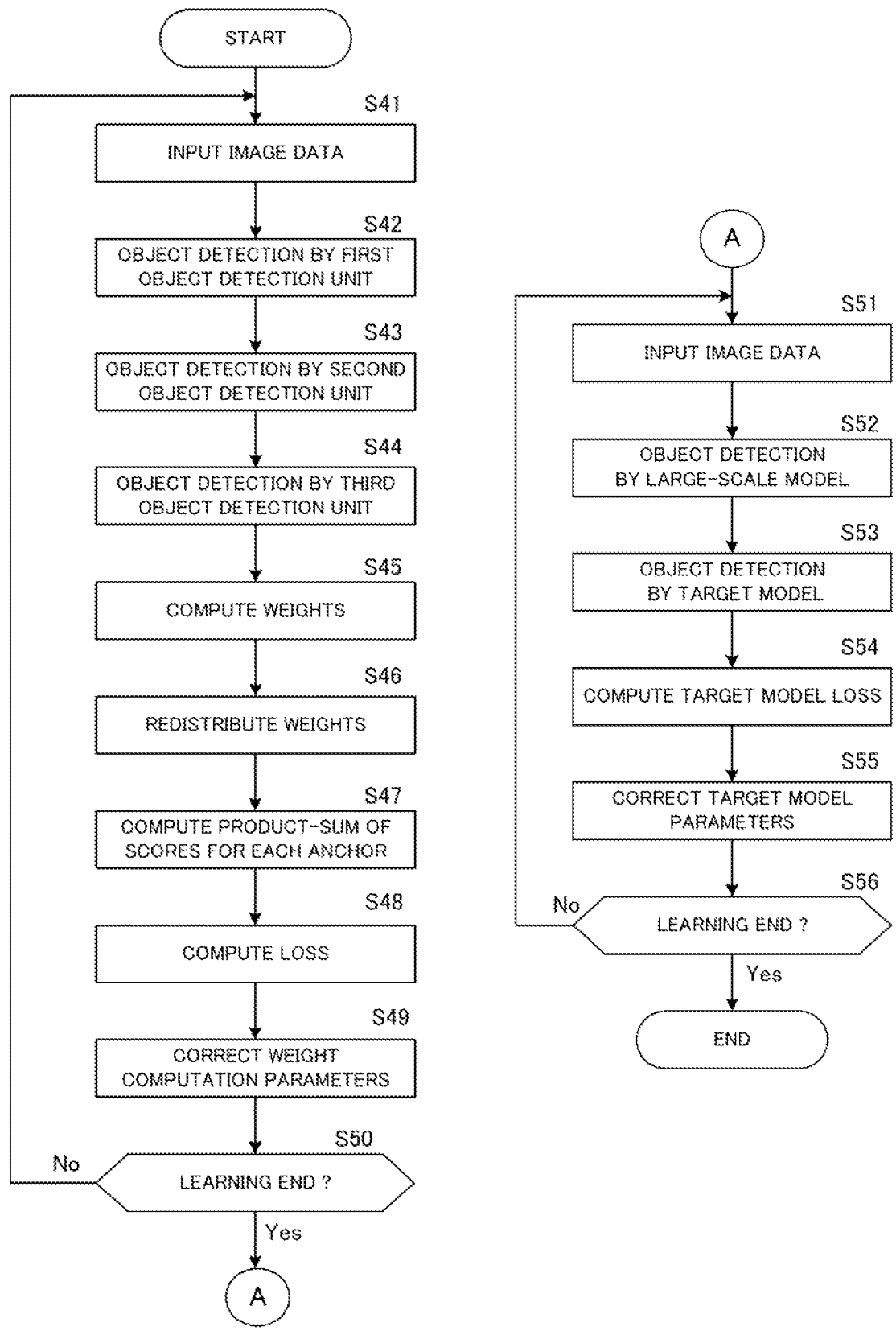
FIG. 17 is a flowchart of learning processing by the object detection device of the fifth example embodiment.

Next, the operation of the object detection device 50 for learning will be described. FIG. 17 is a flowchart of learning processing performed by the object detection device 50. This processing is realized by the processor 3 shown in FIG. 1 executing a program prepared in advance. In FIG. 17, steps S41 to S49 correspond to the large-scale model learning step, and steps S51 to S56 correspond to the target model learning step. During execution of the large-scale model learning step, the target model object detection unit 51, the loss computation unit 52, and the parameter correction unit 53 do not operate. Since the large-scale model learning steps S41 to S49 are the same as steps S41 to S49 of the learning processing performed by the object detection device 40 of the fourth example embodiment shown in FIG. 15, description thereof will be omitted here.

The object detection device 50 repeats the above steps S41 to S49 while a predetermined condition holds true, and then ends the processing. Note that the "predetermined condition" is a condition related to the number of repetitions, the degree of change in the value of the loss, or the like, and any method widely adopted as a learning procedure for deep learning can be used. Thus, a large-scale model is constructed.

When the large-scale model learning step is completed (Step S50: Yes), then the target model learning step is performed. In the target model learning step, the internal parameters of the weight computation unit 12 are fixed to the values learned in the large-scale model learning step. The internal parameters of the first to third object detection units 42 to 44 are also fixed to the values that have been learned in advance.

When the image data for learning is inputted to the image input unit 11 (step S51), the large-scale model unit 50*a* performs object detection using the inputted image data, and outputs the score information and the coordinate information about the recognition target objects in the image to the loss computation unit 52 for each anchor and for each recognition target object (step S52). Further, the target model object detection unit 51 performs object detection using the inputted image data, and outputs the score information and the coordinate information about the recognition target objects in the image to the loss computation unit 52 for each anchor and for each recognition target object (step 53). Next, the loss computation unit 52 compares the score information and the coordinate information outputted by the target model object detection unit 51 with the ground truth label stored in the ground truth label storage unit 18 as well as the score information and the coordinate information outputted by the large-scale model unit 50*a*, and thereby computes the target model loss (step S54). Then, the parameter correction unit 53 corrects the parameters inherent in the target model object detection unit 51 so as to reduce the value of the target model loss (step S55). The object detection device 50 repeats the above-described steps S51 to S55 while a predetermined condition holds true, and then ends the processing.

As described above, according to the object detection device 50 of the fifth example embodiment, first, a large-scale model is learned using a plurality of learned object detection units, and then the target model is learned using the large-scale model. Therefore, it becomes possible to construct a small-scale and high-precision target model suitable for the environment of the new site.

(Functional Configuration for Inference)

Figure 18:
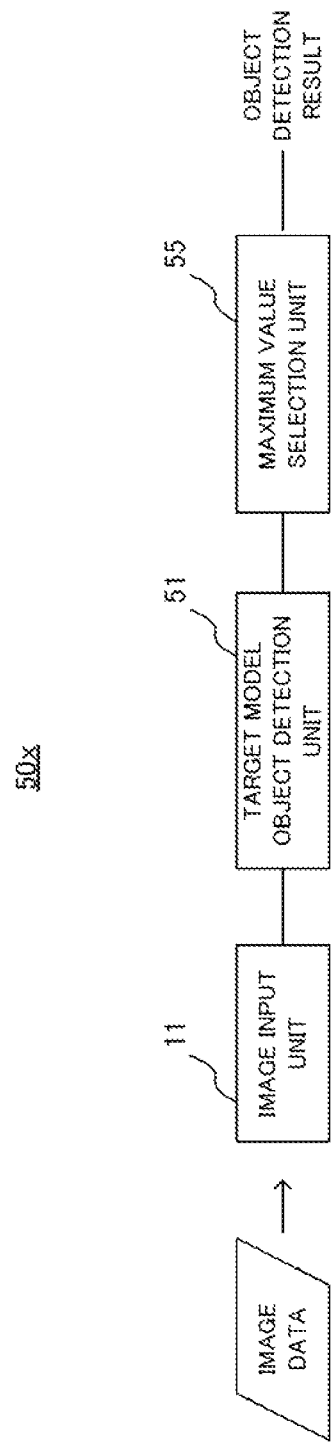
FIG. 18 illustrates a functional configuration of an object detection device for inference according to the fifth example embodiment.

Next, the functional configuration of the object detection device for inference will be described. FIG. 18 is a block diagram illustrating a functional configuration of an object detection device 50*x* for inference. The object detection device 50*x* for inference is also basically realized by the hardware configuration shown in FIG. 1.

As shown in FIG. 18, the object detection device 50x for inference includes an image input unit 11, a target model object detection unit 51, and a maximum value selection unit 55. Here, the image input unit 11 and the target model object detection unit 51 are the same as the object detection device 50 for learning shown in FIG. 16. Incidentally, the target model object detection unit 51 learned by the target model learning step described above is used here.

When the image data for inference is inputted to the image input unit 11, the target model object detection unit 51 performs object detection using the learned internal parameters, and outputs the score information and the coordinate information about the recognition target objects for each anchor and for each recognition target object. The maximum value selection unit 55 identifies the type of the recognition target object by performing NMS processing on the score information of the Nark dimension outputted by the target model object detection unit 51, determines the position of the recognition target object from the coordinate information corresponding to the anchor, and outputs the object detection result. The object detection result includes the type and the position for each recognition target object. Thus, it is possible to obtain the object detection result using the target model object detection unit 51 learned using the large-scale model.

Sixth Example Embodiment

Figure 19:
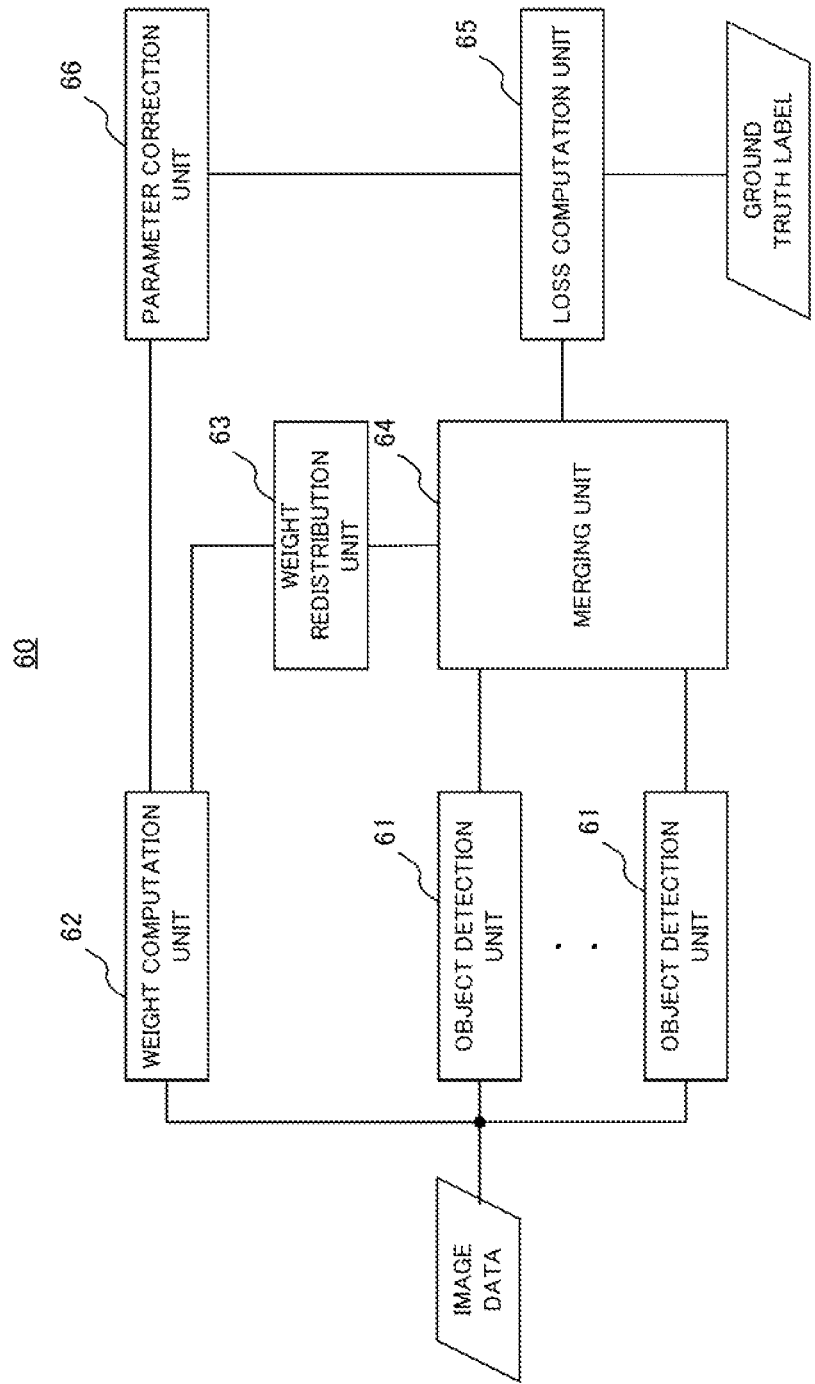
FIG. 19 illustrates a functional configuration of an object detection device for learning according to a sixth example embodiment.

Next, a sixth example embodiment of the present invention will be described. FIG. 19 is a block diagram illustrating a functional configuration of an object detection device 60 for learning according to a sixth example embodiment. Incidentally, the object detection device 60 is realized by the hardware configuration shown in FIG. 1.

The object detection device 60 for learning includes a plurality of object detection units 61, a weight computation unit 62, a weight redistribution unit 63, a merging unit 64, a loss computation unit 65, and a parameter correction unit 66. As image data for learning, image data with ground truth labels are prepared. The plurality of object detection units 61 output a score indicating a probability that a predetermined object exists, for each partial region set with respect to image data inputted. The weight computation unit 62 computes a weight for each of the plurality of object detection units 61 by using weight computation parameters and based on the image data. The weights are used when the scores outputted by the plurality of object detection units 61 are merged. The weight redistribution unit 63 changes the weight for a predetermined object detection unit 61, among the weights computed by the weight computation unit 62, to 0 and output the weights. The merging unit 64 merges the scores outputted by the plurality of object detection units 61 for each of the partial regions, by using the weights computed by the weight computation unit 62 and including the weight changed by the weight redistribution unit 63. The loss computation unit 65 computes a difference between a ground truth label of the image data and the merged score merged by the merging unit 64 as a loss. Then, the parameter correction unit 66 corrects the weight computation parameters so as to reduce the loss.

Seventh Example Embodiment

Figure 20:
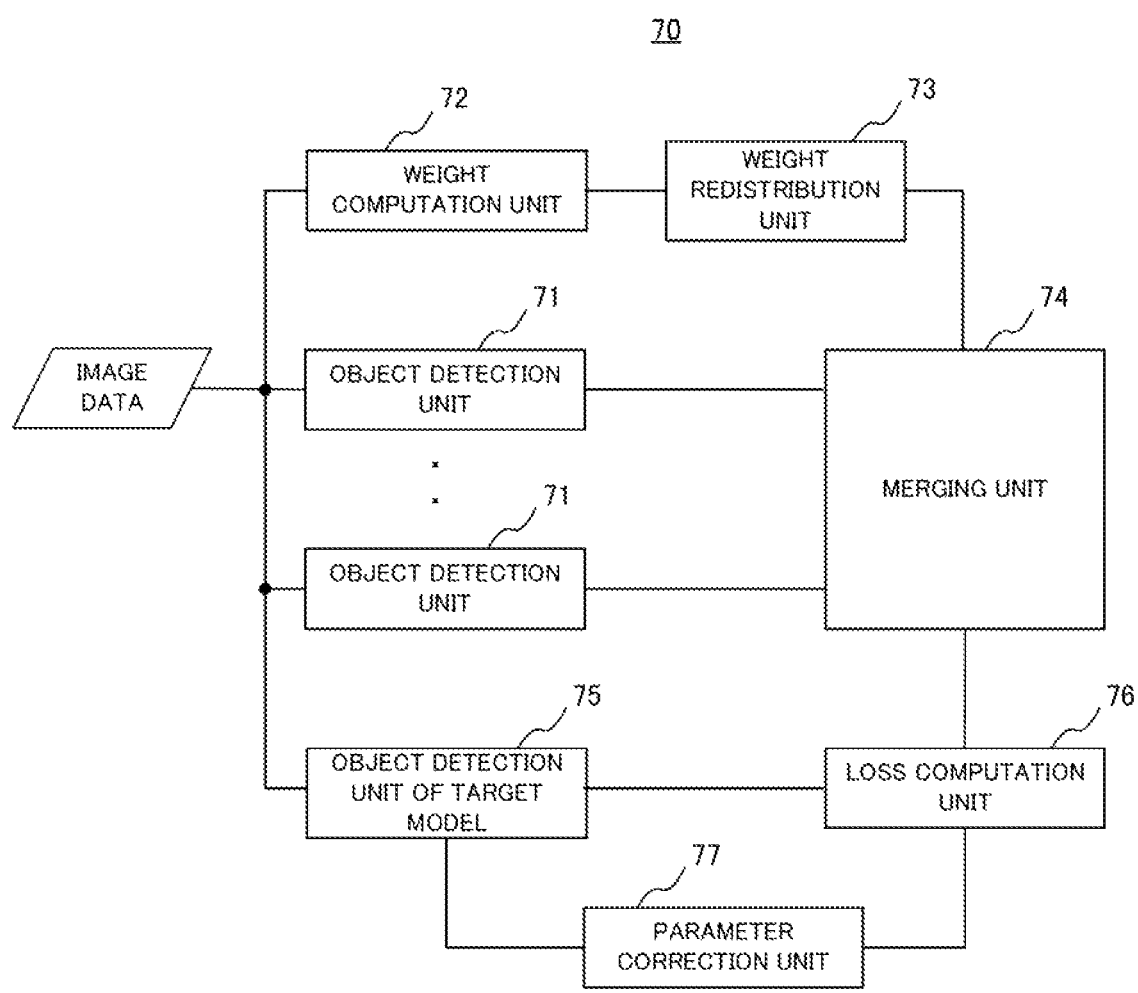
FIG. 20 illustrates a functional configuration of an object detection device for learning according to a seventh example embodiment.

Next, a seventh example embodiment of the present invention will be described. FIG. 20 is a block diagram illustrating a functional configuration of an object detection device 70 for learning according to a seventh example embodiment. Incidentally, the object detection device 70 is realized by the hardware configuration shown in FIG. 1.

The object detection device 70 includes a plurality of object detection units 71, a weight computation unit 72, a weight redistribution unit 73, a merging unit 74, an object detection unit 75 of a target model, a loss computation unit 76, and a parameter correction unit 77. The plurality of object detection units 71 output a score indicating a probability that a predetermined object exists, for each partial region set with respect to image data inputted. The weight computation unit 72 computes weights used for merging the scores outputted by the plurality of object detection units 71 by using weight computation parameters and based on the image data. The weight redistribution unit 73 changes the weight for a predetermined object detection unit 71, among the weights computed by the weight computation unit 72, to 0 and outputs the weights. The merging unit 74 merges the scores outputted by the plurality of object detection units 71 for each of the partial regions, by using the weights computed by the weight computation unit 72 and including the weight changed by the weight redistribution unit 73.

The object detection unit 75 of the target model outputs a score indicating the probability that the predetermined object exists, for each partial region set with respect to the image data. The loss computation unit 76 computes a loss indicating a difference of the output of the object detection unit 75 of the target model from the ground truth label of the image data and the merged score merged by the merging unit 74. Then, the parameter correction unit 77 corrects the parameters of the object detection unit 75 of the target model so as to reduce the loss.

A part or all of the example embodiments described above may also be described as the following supplementary notes, but not limited thereto.

(Supplementary Note 1)

An object detection device comprising:
  a plurality of object detection units configured to output a score indicating a probability that a predetermined object exists, for each partial region set with respect to image data inputted;
  a weight computation unit configured to compute a weight for each of the plurality of object detection units by using weight computation parameters and based on the image data, the weight being used when the scores outputted by the plurality of object detection units are merged;
  a weight redistribution unit configured to change the weight for a predetermined object detection unit, among the weights computed by the weight computation unit, to 0 and output the weights;
  a merging unit configured to merge the scores outputted by the plurality of object detection units for each of the partial regions, by using the weights computed by the weight computation unit and including the weight changed by the weight redistribution unit;
  a loss computation unit configured to compute a difference between a ground truth label of the image data and the merged score merged by the merging unit as a loss; and
  a parameter correction unit configured to correct the weight computation parameters so as to reduce the loss.

(Supplementary Note 2)

An object detection device comprising:
  a plurality of object detection units configured to output a score indicating a probability that a predetermined object exists, for each partial region set with respect to image data inputted;

a weight computation unit configured to compute weights used for merging the scores outputted by the plurality of object detection units by using weight computation parameters and based on the image data;

a weight redistribution unit configured to change the weight for a predetermined object detection unit, among the weights computed by the weight computation unit, to 0 and output the weights;

a merging unit configured to merge the scores outputted by the plurality of object detection units for each of the partial regions, by using the weights computed by the weight computation unit and including the weight changed by the weight redistribution unit;

an object detection unit of a target model configured to output a score indicating the probability that the predetermined object exists, for each partial region set with respect to the image data;

a loss computation unit configured to compute a loss indicating a difference of the output of the object detection unit of the target model from the ground truth label of the image data and the merged score merged by the merging unit; and a parameter correction unit configured to correct the parameters of the object detection unit of the target model so as to reduce the loss.

(Supplementary Note 3)

The object detection device according to Supplementary Note 1 or 2, wherein the weight redistribution unit is configured to normalize the weights which has not been changed to 0, among the weights computed by the weight computation unit, so that the sum of the weights becomes 1, and output the weights.

(Supplementary Note 4)

The object detection device according to any one of Supplementary notes 1 to 3, wherein the weight redistribution unit is configured to perform redistribution of the weights with a predetermined probability.

(Supplementary Note 5)

The object detection device according to any one of Supplementary notes 1 to 4, wherein the weight redistribution unit is configured to change the weight, to 0, for the object detection unit that is learned and constructed using the image data or a part of the image data inputted when the object detection device is learned.

(Supplementary Note 6)

The object detection device according to any one of Supplementary notes 1 to 5,
wherein the weight computation unit is configured to compute a single weight with respect to the image data as a whole, and
wherein the merging unit is configured to merge the scores outputted by the plurality of object detection units by using the single weight.

(Supplementary Note 7)

The object detection device according to any one of Supplementary notes 1 to 5,
wherein the weight computation unit is configured to compute the weight for each partial region of the image data, and
wherein the merging unit is configured to merge the scores outputted by the plurality of object detection units by using the weight computed for each partial region.

(Supplementary Note 8)

The object detection device according to any one of Supplementary notes 1 to 5,
wherein the weight computation unit is configured to compute the weight for each class indicating the object, and
wherein the merging unit is configured to merge the scores outputted by the plurality of object detection units by using the weight computed for each class.

(Supplementary Note 9)

The object detection device according to any one of Supplementary notes 1 to 8, wherein the merging unit is configured to multiply the scores outputted by the plurality of object detection units by the weight for each object detection unit computed by the weight computation unit, add the multiplied scores together, and calculate an average value of the multiplied scores.

(Supplementary Note 10)

The object detection device according to any one of Supplementary notes 1 to 9,
wherein the plurality of object detection units are configured to output coordinate information about a rectangular region where the object exists for each partial region,
wherein the merging unit is configured to merge the coordinate information about the rectangular region where the object exists by using the weight computed by the weight computation unit, and
wherein the loss computation unit is configured to compute a loss including a difference between the ground truth label and the coordinate information merged by the merging unit.

(Supplementary Note 11)

The object detection device according to Supplementary Note 10, wherein the merging unit is configured to multiply the coordinate information outputted by the plurality of object detection units by the weight for each object detection unit computed by the weight computation unit, add the multiplied scores together, and calculate an average value of the multiplied scores.

(Supplementary Note 12)

The object detection device according to any one of Supplementary notes 1 to 11, wherein the weight computation unit is configured to use shooting environment prediction parameters to predict a shooting environment of the image data, and output predicted environment information,
wherein the object detection device further comprises a prediction loss computation unit configured to compute a shooting environment prediction loss on a basis of shooting environment information about the image data prepared in advance and the predicted environment information, and
wherein the parameter correction unit is configured to correct the shooting environment prediction parameters so as to reduce the prediction loss.

(Supplementary Note 13)

The object detection device according to Supplementary Note 12, wherein the weight computation unit is provided with a first network including the weight computation parameters and a second network including the shooting environment prediction parameters, and
wherein the first network and the second network have a portion shared in common.

(Supplementary Note 14)

A learning method of an object detection device, comprising:
outputting, by a plurality of object detection units, a score indicating a probability that a predetermined object exists, for each partial region set with respect to image data inputted;

computing a weight for each of the plurality of object detection units by using weight computation parameters and based on the image data, the weight being used when the scores outputted by the plurality of object detection units are merged;

changing the weight for a predetermined object detection unit, among the computed weights, to 0 and outputting the weights;

merging the scores outputted by the plurality of object detection units for each of the partial regions, by using the computed weights including the changed weight;

computing a difference between a ground truth label of the image data and the merged score as a loss; and correcting the weight computation parameters so as to reduce the loss.

(Supplementary Note 15)

A learning method of an object detection device, comprising:

outputting, by a plurality of object detection units, a score indicating a probability that a predetermined object exists, for each partial region set with respect to image data inputted;

computing weights used for merging the scores outputted by the plurality of object detection units by using weight computation parameters and based on the image data;

changing the weight for a predetermined object detection unit, among the computed weights, to 0 and outputting the weights;

merging the scores outputted by the plurality of object detection units for each of the partial regions, by using the computed weights including the changed weight;

outputting, by an object detection unit of a target model, a score indicating the probability that the predetermined object exists, for each partial region set with respect to the image data;

computing a loss indicating a difference of the output of the object detection unit of the target model from the ground truth label of the image data and the merged score; and correcting the parameters of the object detection unit of the target model so as to reduce the loss.

(Supplementary Note 16)

A recording medium storing a program causing a computer to execute:

outputting, by a plurality of object detection units, a score indicating a probability that a predetermined object exists for each partial region set with respect to image data inputted;

computing a weight for each of the plurality of object detection units by using weight computation parameters and based on the image data, the weight being used when the scores outputted by the plurality of object detection units are merged;

changing the weight for a predetermined object detection unit, among the computed weights, to 0 and outputting the weights;

merging the scores outputted by the plurality of object detection units for each of the partial regions, by using the computed weights including the changed weight;

computing a difference between a ground truth label of the image data and the merged score as a loss; and correcting the weight computation parameters so as to reduce the loss.

(Supplementary Note 17)

A recording medium storing a program causing a computer to execute:

outputting, by a plurality of object detection units, a score indicating a probability that a predetermined object exists, for each partial region set with respect to image data inputted;

computing weights used for merging the scores outputted by the plurality of object detection units by using weight computation parameters and based on the image data;

changing the weight for a predetermined object detection unit, among the computed weights, to 0 and outputting the weights;

merging the scores outputted by the plurality of object detection units for each of the partial regions, by using the computed weights including the changed weight;

outputting, by an object detection unit of a target model, a score indicating the probability that the predetermined object exists, for each partial region set with respect to the image data;

computing a loss indicating a difference of the output of the object detection unit of the target model from the ground truth label of the image data and the merged score; and correcting the parameters of the object detection unit of the target model so as to reduce the loss.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS 10, 10$x$, 20, 20$x$, 30, 30$x$, 40, 50, 50$x$ Object detection device
11 Image input unit
12, 35 Weight computation unit
13, 14, 42, 43, 44 Object detection unit
15 Product-sum unit
16, 53 Parameter correction unit
17, 52 Loss computation unit
18 Correct label storage unit
19 Maximum value selection unit
21 Per-anchor weight computation unit
22 Per-anchor parameter correction unit
31 Weight computation/environment prediction unit
32 Prediction loss computation unit
41 Weight redistribution unit

What is claimed is:

1. An object detection device comprising:
a memory configured to store instructions; and
one or more processors configured to execute the instructions to:
output, by a plurality of object detection units, a score indicating a probability that a predetermined object exists, for each partial region set with respect to image data inputted;
compute a weight for each of the plurality of object detection units by using weight computation parameters and based on the image data, the weight being used when the scores outputted by the plurality of object detection units are merged;
to change the weight for a predetermined object detection unit, among the computed weights, to 0 and output the weights;

merge the scores outputted by the plurality of object detection units for each of the partial regions, by using the computed weights and including the changed weight;

compute a difference between a ground truth label of the image data and the merged score as a loss; and correct the weight computation parameters so as to reduce the loss.

2. The object detection device according to claim 1, wherein the one or more processors are configured to normalize the weights which has not been changed to 0, among the computed weights, so that the sum of the weights becomes 1, and output the weights.

3. The object detection device according to claim 1, wherein the one or more processors are configured to perform redistribution of the weights with a predetermined probability.

4. The object detection device according to claim 1, wherein the one or more processors are configured to change the weight, to 0, for the object detection unit that is learned and constructed using the image data or a part of the image data inputted when the object detection device is learned.

5. The object detection device according to claim 1,
wherein the one or more processors are configured to compute a single weight with respect to the image data as a whole, and
wherein the one or more processors are configured to merge the scores outputted by the plurality of object detection units by using the single weight.

6. The object detection device according to claim 1,
wherein the one or more processors are configured to compute the weight for each partial region of the image data, and
wherein the one or more processors are configured to merge the scores outputted by the plurality of object detection units by using the weight computed for each partial region.

7. The object detection device according to claim 1,
wherein the one or more processors are configured to compute the weight for each class indicating the object, and
wherein the one or more processors are configured to merge the scores outputted by the plurality of object detection units by using the weight computed for each class.

8. The object detection device according to claim 1, wherein the one or more processors are configured to multiply the scores outputted by the plurality of object detection units by the computed weight for each object detection unit, add the multiplied scores together, and calculate an average value of the multiplied scores.

9. The object detection device according to claim 1,
wherein the plurality of object detection units are configured to output coordinate information about a rectangular region where the object exists for each partial region,
wherein the one or more processors are configured to merge the coordinate information about the rectangular region where the object exists by using the computed weight, and
wherein the one or more processors are configured to compute a loss including a difference between the ground truth label and the coordinate information merged.

10. The object detection device according to claim 9, wherein the one or more processors are configured to multiply the coordinate information outputted by the plurality of object detection units by the computed weight for each object detection unit, add the multiplied scores together, and calculate an average value of the multiplied scores.

11. The object detection device according to claim 1,
wherein the one or more processors are configured to use shooting environment prediction parameters to predict a shooting environment of the image data, and output predicted environment information,
wherein the one or more processors are configured to compute a shooting environment prediction loss on a basis of shooting environment information about the image data prepared in advance and the predicted environment information, and
wherein the one or more processors are configured to correct the shooting environment prediction parameters so as to reduce the prediction loss.

12. The object detection device according to claim 11, wherein the one or more processors are provided with a first network including the weight computation parameters and a second network including the shooting environment prediction parameters, and
wherein the first network and the second network have a portion shared in common.

13. An object detection device comprising:
a memory configured to store instructions; and
one or more processors configured to execute the instructions to:
output, by a plurality of object detection units, a score indicating a probability that a predetermined object exists, for each partial region set with respect to image data inputted;
compute weights used for merging the scores outputted by the plurality of object detection units by using weight computation parameters and based on the image data;
change the weight for a predetermined object detection unit, among the computed weights, to 0 and output the weights;
merge the scores outputted by the plurality of object detection units for each of the partial regions, by using the computed weights and including the changed weight;
output, by an object detection unit of a target model, a score indicating the probability that the predetermined object exists, for each partial region set with respect to the image data;
compute a loss indicating a difference of the output of the object detection unit of the target model from a ground truth label of the image data and the merged score; and
correct the parameters of the object detection unit of the target model so as to reduce the loss.

14. A learning method of an object detection device, comprising:
outputting, by a plurality of object detection units, a score indicating a probability that a predetermined object exists, for each partial region set with respect to image data inputted;
computing a weight for each of the plurality of object detection units by using weight computation parameters and based on the image data, the weight being used when the scores outputted by the plurality of object detection units are merged;
changing the weight for a predetermined object detection unit, among the computed weights, to 0 and outputting the weights;

merging the scores outputted by the plurality of object detection units for each of the partial regions, by using the computed weights including the changed weight;

computing a difference between a ground truth label of the image data and the merged score as a loss; and correcting the weight computation parameters so as to reduce the loss.

15. A non-transitory computer-readable recording medium having recorded thereon instructions executable by a processor to perform the method of claim 14.

16. A learning method of an object detection device, comprising:

outputting, by a plurality of object detection units, a score indicating a probability that a predetermined object exists, for each partial region set with respect to image data inputted;

computing weights used for merging the scores outputted by the plurality of object detection units by using weight computation parameters and based on the image data;

changing the weight for a predetermined object detection unit, among the computed weights, to 0 and outputting the weights;

merging the scores outputted by the plurality of object detection units for each of the partial regions, by using the computed weights including the changed weight;

outputting, by an object detection unit of a target model, a score indicating the probability that the predetermined object exists, for each partial region set with respect to the image data;

computing a loss indicating a difference of the output of the object detection unit of the target model from a ground truth label of the image data and the merged score; and correcting the parameters of the object detection unit of the target model so as to reduce the loss.

17. A non-transitory computer-readable recording medium having recorded thereon instructions executable by a processor to perform the method of claim 16.

* * * * *